(12) United States Patent
Watanabe

(10) Patent No.: US 9,018,814 B2
(45) Date of Patent: Apr. 28, 2015

(54) MOTOR

(71) Applicant: Nidec Corporation, Kyoto (JP)

(72) Inventor: Yuji Watanabe, Kyoto (JP)

(73) Assignee: Nidec Corporation, Kyoto (JP)

( * ) Notice: Subject to any disclaimer, the term of this patent is extended or adjusted under 35 U.S.C. 154(b) by 339 days.

(21) Appl. No.: 13/741,612

(22) Filed: Jan. 15, 2013

(65) Prior Publication Data

US 2013/0187498 A1 Jul. 25, 2013

(30) Foreign Application Priority Data

Jan. 20, 2012 (JP) ................. 2012-010451

(51) Int. Cl.
*H02K 5/16* (2006.01)
*H02K 5/173* (2006.01)
*F16C 33/02* (2006.01)

(52) U.S. Cl.
CPC ............... *H02K 5/163* (2013.01); *F16C 33/02* (2013.01); *H02K 5/173* (2013.01)

(58) Field of Classification Search
CPC ..... H02K 5/163; H02K 1/187; H02K 5/1735; H02K 5/187; H02K 5/15; H02K 5/1675; F16C 33/02; F16C 33/12; F16C 33/06; F16C 33/08; F16C 33/74
USPC ............................. 310/90, 91, 67 R; 384/286
See application file for complete search history.

(56) References Cited

U.S. PATENT DOCUMENTS

| | | | | |
|---|---|---|---|---|
| 5,363,003 | A | * | 11/1994 | Harada et al. ............... 310/67 R |
| 6,072,261 | A | * | 6/2000 | Lin ............................... 310/424 |
| 6,617,736 | B1 | * | 9/2003 | Horng et al. ..................... 310/91 |
| 6,734,591 | B2 | * | 5/2004 | Obara et al. ..................... 310/90 |
| 6,882,074 | B2 | * | 4/2005 | Horng et al. ..................... 310/90 |
| 8,049,381 | B2 | * | 11/2011 | Lu ................................ 310/67 R |
| 2006/0119200 | A1 | * | 6/2006 | Chin-Long et al. ............. 310/91 |

FOREIGN PATENT DOCUMENTS

| | | |
|---|---|---|
| JP | 2003-088009 A | 3/2003 |
| JP | 2004-072974 A | 3/2004 |
| JP | 2004-229468 A | 8/2004 |
| JP | 2006-005972 A | 1/2006 |
| JP | 2007-110791 A | 4/2007 |
| JP | 2008-289323 A | 11/2008 |

OTHER PUBLICATIONS

Watanabe et al., "MOTOR", U.S. Appl. No. 13/741,630, filed Jan. 15, 2013.

* cited by examiner

*Primary Examiner* — Dang Le
*Assistant Examiner* — Leda Pham
(74) *Attorney, Agent, or Firm* — Keating & Bennett, LLP

(57) ABSTRACT

A motor includes a bearing holder having a substantially cylindrical shape and a surrounding member fixed to a radial outer surface of the bearing holder. The bearing holder includes a plurality of holder protrusion portions each including a radial outer surface at least partially making contact with the surrounding member and a plurality of holder recess portions positioned radially inward of the plurality of holder protrusion portions. The plurality of holder protrusion portions and the plurality of holder recess portions are alternately arranged along a circumferential direction. A central angle of a portion of an inner circumferential surface of the surrounding member remaining out of contact with each of the plurality of holder protrusion portions is equal to or larger than a central angle of a portion of an outer circumferential surface of a bearing unit.

19 Claims, 21 Drawing Sheets

MOTOR

BACKGROUND OF THE INVENTION

1. Field of the Invention

The present invention relates to a motor.

2. Description of the Related Art

A conventional motor is disclosed in, e.g., Japanese Patent Application Publication No. 2004-229468. The motor disclosed in this publication includes a center piece provided as a support member and a stator core fixed to the center piece (see Paragraph 0020 and FIGS. 1 and 3 of JP 2004-229468. In this motor, a bearing is press-fitted and fixed to the inner circumferential surface of a cylindrical portion of the center piece (see Paragraph 0022 and FIG. 1 of JP 2004-229468).

JP 2004-229468 also discloses an example in which a plurality of projections is formed on the outer circumferential surface of the cylindrical portion of the center piece (see Paragraph 0043 and FIG. 5 of JP 2004-229468). In this example, a plurality of salient portions formed in the stator core makes pressure contact with the outer circumferential surface of the center piece existing between the projections, whereby the center piece and the stator core are fixed to each other.

In the structure in which the center piece and the stator core are brought into pressure contact with each other, however, it is sometimes the case that the center piece is deformed radially inward. If the center piece undergoes radially inward deformation, it is likely that a small distortion is generated a bearing fixed to the inner circumferential surface of the center piece. The small distortion of the bearing may be permitted depending on the use of a motor. However, with a view towards obtaining a higher quality motor, there is a strong demand to reduce the distortion of the bearing.

SUMMARY OF THE INVENTION

Preferred embodiments of the present invention provide a motor that includes a substantially cylindrical bearing holder, a bearing unit fixed to the radial inner surface of the bearing holder, and a surrounding member fixed to the radial outer surface of the bearing holder.

Preferred embodiments of the present invention provide a motor capable of significantly reducing and preventing deformation of a bore of a bearing holder and the resultant distortion of a bearing unit caused by deformation of the bore.

In accordance with aspect preferred embodiment of the present invention, there is provided a motor, including a bearing holder axially having in a substantially cylindrical shape extending along a vertically-extending center axis; a bearing unit fixed to a radial inner surface of the bearing holder; a surrounding member fixed to a radial outer surface of the bearing holder, the surrounding member including an insertion hole through which the bearing holder is inserted; a shaft rotatably supported by the bearing unit; and a magnet rotating together with the shaft, wherein the bearing holder includes a plurality of holder protrusion portions each including a radial outer surface at least partially making contact with the surrounding member and a plurality of holder recess portions positioned radially inward of the plurality of holder protrusion portions, each of the plurality of holder recess portions including a radial inner surface at least partially making contact with the bearing unit, the plurality of holder protrusion portions and the plurality of holder recess portions are alternately arranged along a circumferential direction, the central angle of a portion of an inner circumferential surface of the surrounding member remaining out of contact with each of the plurality of holder protrusion portions is equal to or larger than the central angle of a portion of an outer circumferential surface of the bearing unit making contact with each of the plurality of holder recess portions.

According to a preferred embodiment of the present application, contact portions between the plurality of holder protrusion portions and the surrounding member do not axially overlap with contact portions between the plurality of holder recess portions and the bearing unit. For that reason, stresses are not, or are barely transferred from the contact portions between the plurality of holder protrusion portions and the surrounding member to the contact portions between the plurality of holder recess portions and the bearing unit. Accordingly, the deformation of bores of the plurality of holder recess portions and the resultant distortion of the bearing unit are not likely to occur.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Illustrative preferred embodiments of the present invention will now be described with reference to the drawings. In the subject specification, the direction extending along the center axis of a motor will be referred to as "axial direction". The direction orthogonal to the center axis of a motor will be referred to as "radial direction". The direction extending along a circular arc about the center axis of a motor will be referred to as "circumferential direction". In the subject specification, the shape and positional relationship of individual components will be described under the assumption that the axial direction is an up-down direction and the side of a stator core with respect to an attachment plate is an "upper side". However, these definitions are made merely for the sake of convenience in description and are not intended to limit the direction when the present motor is used.

First Preferred Embodiment

Figure 1:
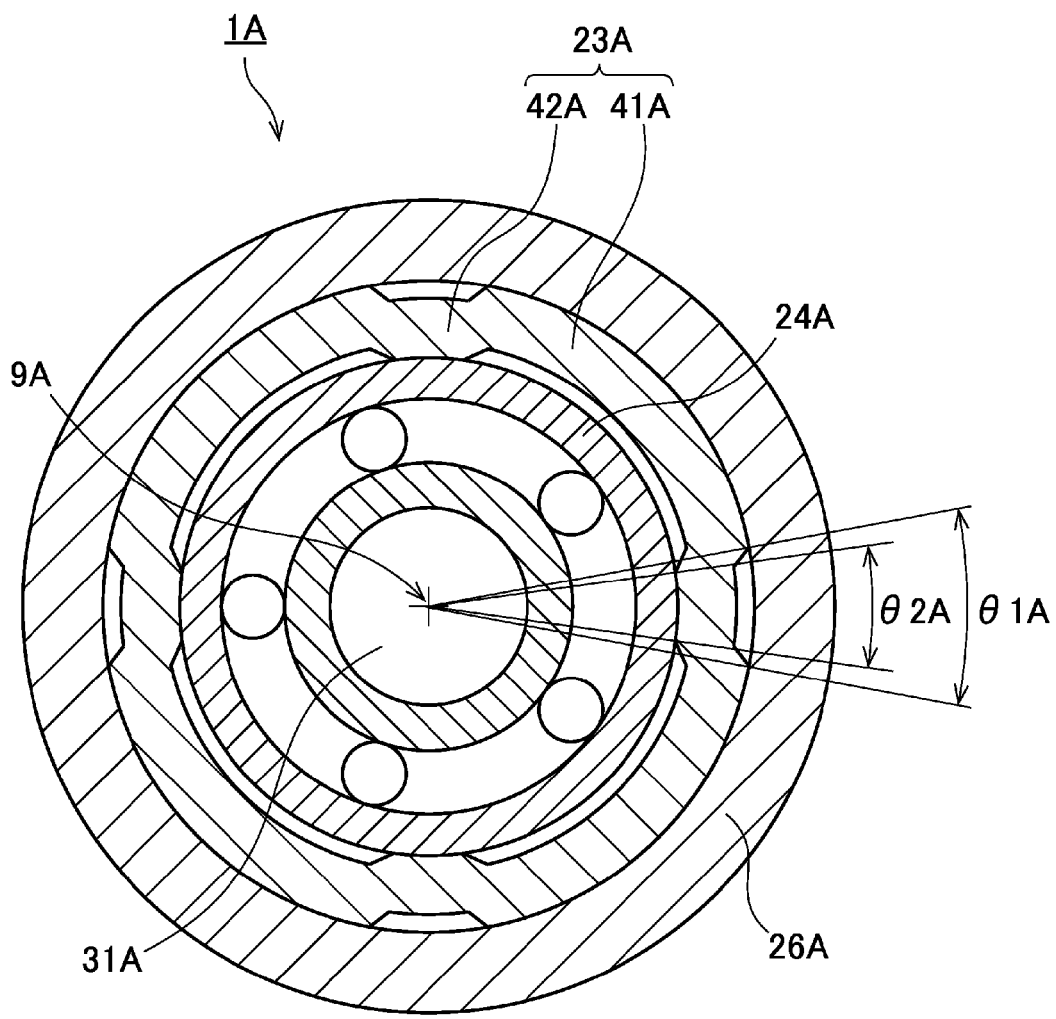
FIG. 1 is a partial horizontal section view showing a motor according to a first preferred embodiment of the present invention.

FIG. 1 is a partial horizontal section view showing a motor 1A according to a first preferred embodiment of the present invention. As shown in FIG. 1, the motor 1A preferably includes a bearing holder 23A, a bearing unit 24A, a surrounding member 26A, and a shaft 31A.

The bearing holder 23A preferably has a substantially cylindrical shape extending axially along a center axis 9A. The bearing unit 24A is fixed to the radial inner surface of the bearing holder 23A. The surrounding member 26A is fixed to the radial outer surface of the bearing holder 23A. The shaft 31A is rotatably supported by the bearing unit 24A. The motor 1A preferably further includes a magnet (not shown in the drawings). The magnet rotates together with the shaft 31A.

The bearing holder 23A preferably includes a plurality of holder protrusion portions 41A and a plurality of holder recess portions 42A. The holder recess portions 42A are positioned more radially inward than the holder protrusion portions 41A. The holder protrusion portions 41A and the holder recess portions 42A are alternately arranged along the circumferential direction. Each of the holder protrusion portions 41A includes a radial outer surface at least partially making contact with the surrounding member 26A. Each of the holder recess portions 42A includes a radial inner surface at least partially making contact with the bearing unit 24A.

As shown in FIG. 1, the central angle of the portion of the inner circumferential surface of the surrounding member 26A remaining out of contact with each of the holder protrusion portions 41A is defined as θ1A. The central angle of the portion of the outer circumferential surface of the bearing unit 24A making contact with each of the holder recess portions 42A is defined as θ2A. In the motor 1A, the central angle θ1A is equal to or larger than the central angle θ2A. For that reason, the contact portions between the holder protrusion portions 41A and the surrounding member 26A do not radially overlap with the contact portions between the holder recess portions 42A and the bearing unit 24A.

With this structure, stresses are not, or are barely transferred from the contact portions between the holder protrusion portions 41A and the surrounding member 26A to the contact portions between the holder recess portions 42A and the bearing unit 24A. Accordingly, even if the holder protrusion portions 41A are pushed radially inward by, for example, a press-fitting work, deformation of a bore of the bearing holder 23A and resultant distortion of the bearing unit 24A are not likely to occur.

Second Preferred Embodiment

Next, description will be made on a motor according to a second preferred embodiment of the present invention.

Figure 2:
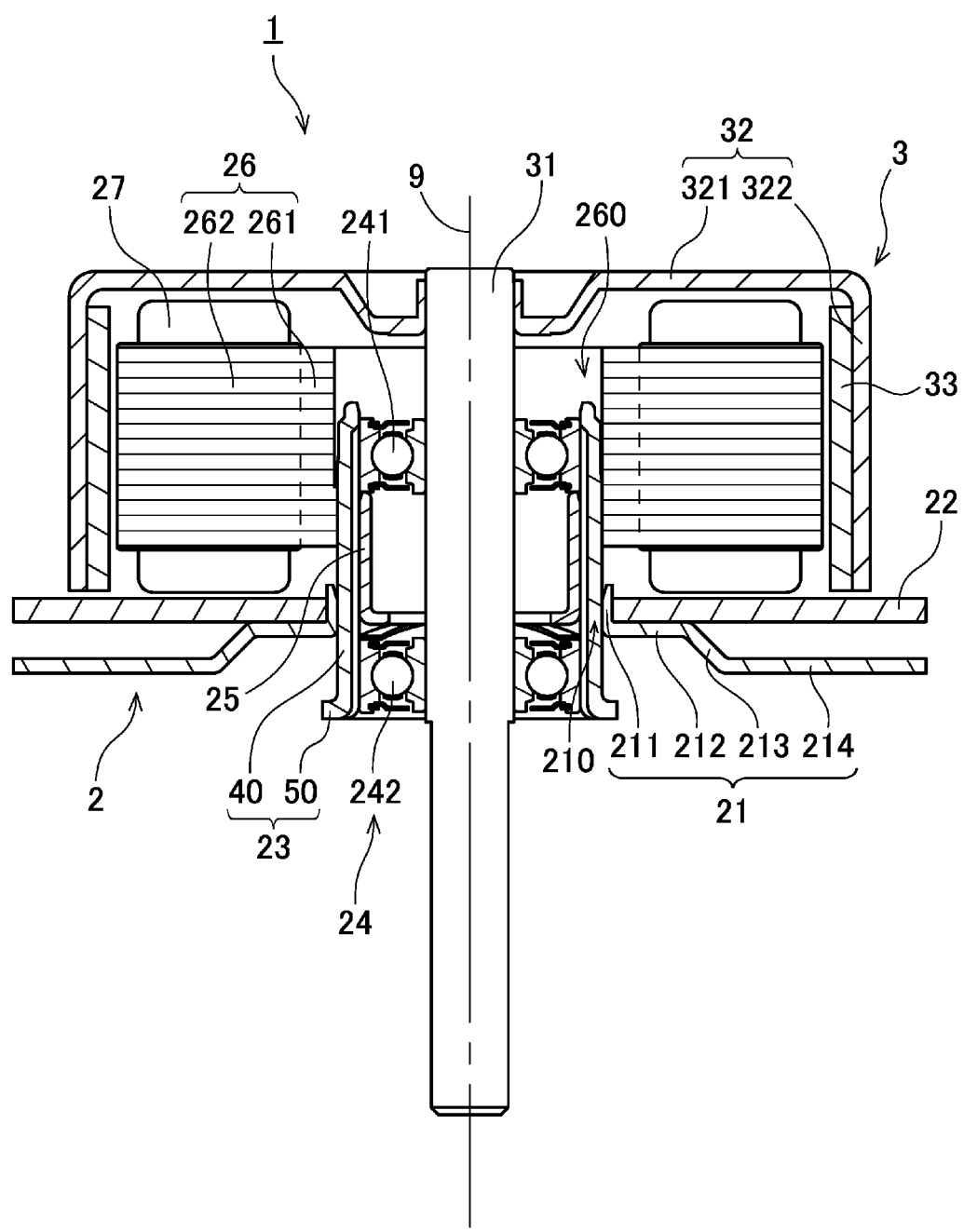
FIG. 2 is a vertical section view showing a motor according to a second preferred embodiment of the present invention.

FIG. 2 is a vertical section view showing a motor 1 according to a second preferred embodiment of the present invention. The motor 1 of the present preferred embodiment is preferably mounted to, e.g., an office automation device such as a printer, a copier, etc., and is used to operate a drive unit such as, for example, a roller or the like. However, the motor of this and other preferred embodiments of the present invention may be used in applications other than the office automation device. For example, the motor of various preferred embodiments of the present invention may be used in a transportation device such as a motor vehicle, a home appliance, a medical device, a disk drive, a blower fan, and so forth.

As shown in FIG. 2, the motor 1 preferably includes a stationary unit 2 and a rotary unit 3. The stationary unit 2 is kept stationary with respect to a frame of a device to be driven. The rotary unit 3 is rotatably supported with respect to the stationary unit 2.

The stationary unit 2 of the present preferred embodiment preferably includes an attachment plate 21, a circuit board 22, a bearing holder 23, a bearing unit 24, a spacer 25, a stator core 26, and a coil 27.

The attachment plate 21 is a plate extending in a direction orthogonal to a center axis 9. The attachment plate 21 is preferably made of metal higher in rigidity than the circuit board 22. For example, galvanized sheet iron, stainless steel, or aluminum alloy is preferably used as the material of the attachment plate 21. The attachment plate 21 is preferably fixed to a frame of a device to be driven.

The attachment plate 21 includes a first insertion hole 210 through which the bearing holder 23 is inserted. The first insertion hole 210 is a circular hole arranged in a coaxial or a substantially coaxial relationship with the center axis 9. The attachment plate 21 preferably includes a burring portion 211, an inner flat portion 212, a transition portion 213, and an outer flat portion 214. The burring portion 211 protrudes axially upward from the verge of the first insertion hole 210 in a substantially cylindrical shape. The inner flat portion 212 extends radially outward from the lower end section of the burring portion 211. The transition portion 213 obliquely extends in a direction radially outward and downward from the outer peripheral section of the inner flat portion 212. The outer flat portion 214 extends radially outward from the lower end section of the transition portion 213.

The attachment plate 21 of the present preferred embodiment is one example of a surrounding member that surrounds the bearing holder 23. The bearing holder 23 is preferably, for example, press-fitted to the radial inner surface of the burring portion 211. As a consequence of this press-fitting, the attachment plate 21 is fixed to the radial outer surface of the bearing holder 23. When press-fitting the bearing holder 23, the transition portion 213 is bent so as to preferably reduce the press-fitting load applied to the outer flat portion 214. As a result, the outer flat portion 214 is prevented or substantially prevented from being deformed in a press-fitting process.

If an eccentric load is applied to a rotor holder 32 (to be further described below), a radial load is applied to a shaft 31 and is transferred to the bearing unit 24. Thus a load is applied to the attachment plate 21. Since the attachment plate 21 of the present preferred embodiment includes the transition portion 213, the load acts on not only the lower end section of the burring portion 211 but also the upper and lower end sections of the transition portion 213. This reduces the stress caused by the load acting on the lower end section of the burring portion 211. As a result, the burring portion 211 is prevented or substantially prevented from being deformed during the operation of the motor 1.

The circuit board 22 is arranged on the upper surface of the inner flat portion 212. For example, a glass epoxy substrate or a paper phenol substrate is used as the circuit board 22. An electronic circuit arranged to supply a drive current to the coil 27 is preferably mounted to the circuit board 22. In the present preferred embodiment, the transition portion 213 of the attachment plate 21 extends away from the circuit board 22. Therefore, a gap exists between the transition portion 213, the upper surface of the outer flat portion 214 and the lower surface of the circuit board 22. This makes it possible to arrange electronic components not only on the upper surface of the circuit board 22 but also on the lower surface of the circuit board 22.

Figure 3:
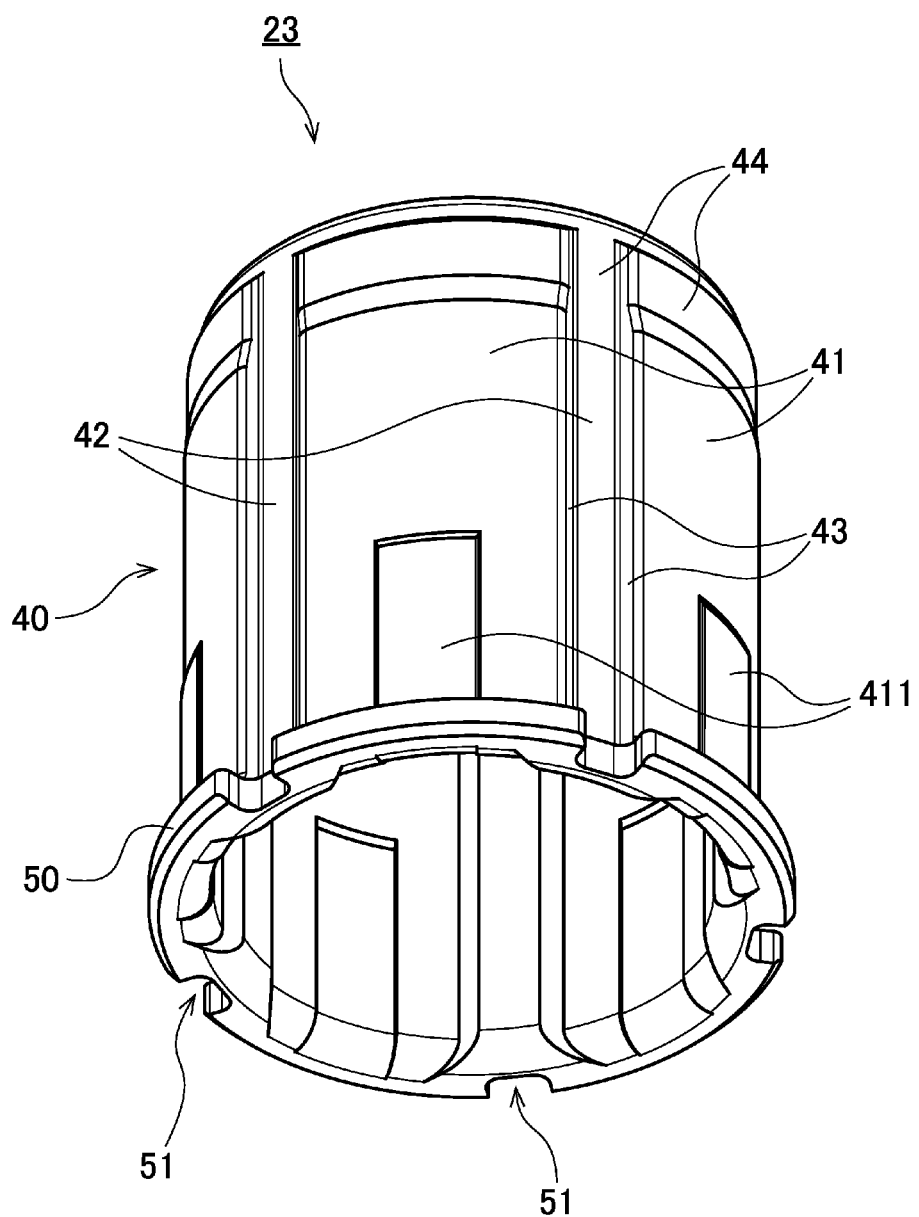
FIG. 3 is a perspective view showing a bearing holder according to the second preferred embodiment of the present invention.
Figure 4:
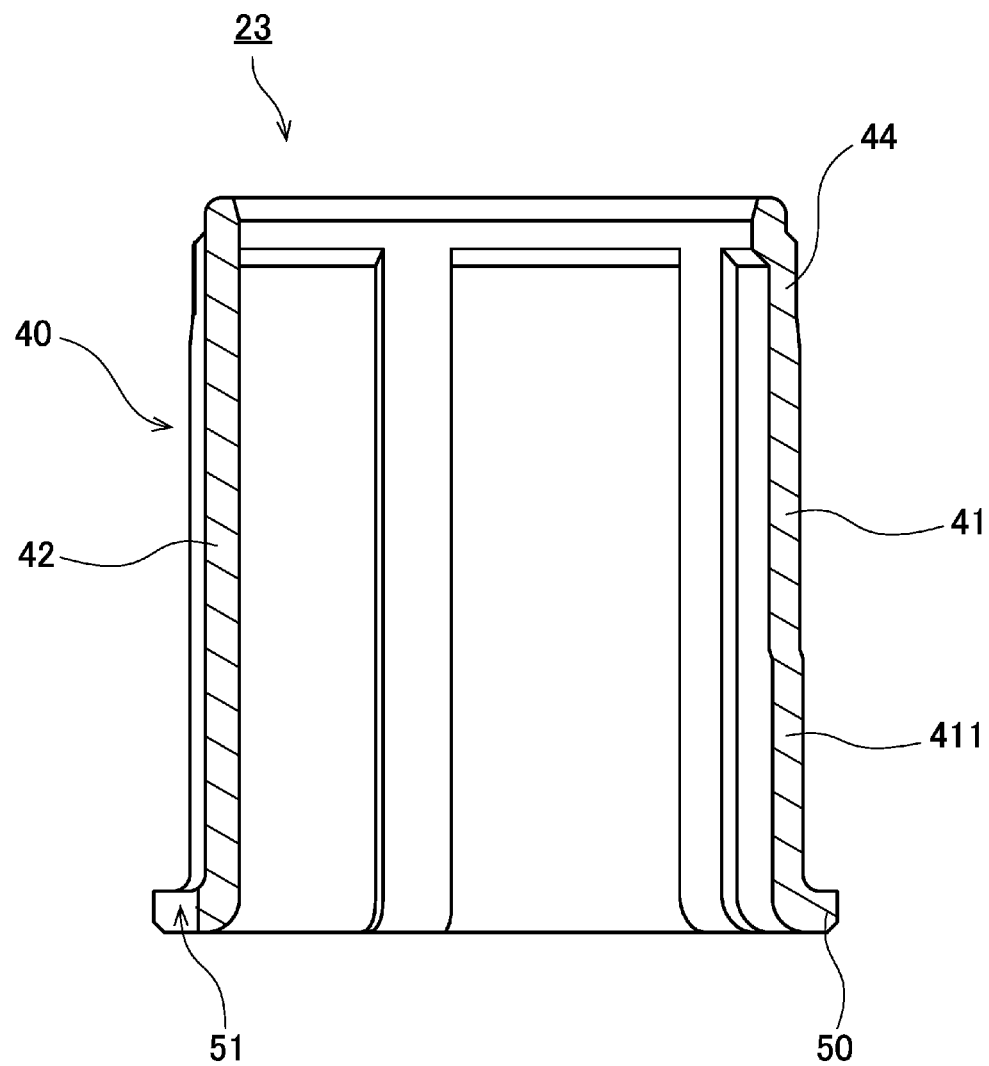
FIG. 4 is a vertical section view of the bearing holder according to the second preferred embodiment of the present invention.

FIG. 3 is a perspective view of the bearing holder 23. FIG. 4 is a vertical section view of the bearing holder 23. As shown in FIGS. 3 and 4, the bearing holder 23 preferably includes a tubular portion 40 and a flange portion 50. The tubular portion 40 preferably has a substantially cylindrical shape that axially extends along the center axis 9. The flange portion 50 extends radially outward from the lower end section of the tubular portion 40.

The tubular portion 40 preferably includes a plurality of holder protrusion portions 41, a plurality of holder recess portions 42, a plurality of slant portions 43 and an insertion portion 44. The radial outer surfaces of the holder protrusion portions 41 are positioned more radially outward than the radial outer surfaces of the holder recess portions 42. The radial inner surfaces of the holder recess portions 42 are positioned more radially inward than the radial inner surfaces of the holder protrusion portions 41. The holder protrusion portions 41 and the holder recess portions 42 are alternately arranged along the circumferential direction.

The radial outer surface of each of the holder protrusion portions 41 makes contact with the inner circumferential surface of the burring portion 211 of the attachment plate 21 and the inner circumferential surface of a core-back 261 of the stator core 26. On the other hand, the radial inner surface of each of the holder recess portions 42 makes contact with outer races of a first bearing 241 and a second bearing 242 to be described later.

The slant portions 43 are positioned between the holder protrusion portions 41 and the holder recess portions 42. The respective slant portions 43 interconnect the circumferential edges of the holder protrusion portions 41 and the circumferential edges of the holder recess portions 42. The respective slant portions 43 extend obliquely with respect to the radial direction and the circumferential direction. As a result, the radial outer surfaces of the holder protrusion portions 41 and the radial inner surfaces of the holder recess portions 42 are arranged in different circumferential positions.

The insertion portion 44 is arranged above the holder protrusion portions 41 and the holder recess portions 42. The outer diameter of the insertion portion 44 is preferably smaller than the outer diameter of the holder protrusion portions 41 over the whole circumference of the insertion portion 44. When, for example, press-fitting the bearing holder 23 to the attachment plate 21, the insertion portion 44 is preferably first inserted into the burring portion 211. When, for example, press-fitting the bearing holder 23 to the stator core 26, the insertion portion 44 is preferably first inserted into the core-back 261. This makes it possible to readily position the bearing holder 23 in a coaxial relationship with the burring portion 211 and the core-back 261.

The bearing holder 23 of the present preferred embodiment is preferably a press-formed article made of, for example, metal. When manufacturing the bearing holder 23 in accordance with a preferred embodiment of the present invention, a metal plate is preferably first subjected to a drawing work, thereby forming the tubular portion 40. Thereafter, the outer peripheral section of the flange portion 50 is preferably punched to obtain the bearing holder 23. In this case, the outer peripheral section of the flange portion 50 formed by punching is higher in dimensional accuracy than the outer circumferential surface of the tubular portion 40 formed by drawing. Accordingly, when the motor 1 is fixed to a device to be driven, it is desirable to position the motor 1 with respect to the device using the flange portion 50.

The bearing holder of preferred embodiments of the present invention may be produced by other methods such as, for example, cutting and casting.

Referring back to FIG. 2, the bearing unit 24 is a mechanism arranged to rotatably support the shaft 31 of the rotary unit 3. The bearing unit 24 of the present preferred embodiment preferably includes the first bearing 241 and the second bearing 242. The second bearing 242 is arranged below the first bearing 241. Ball bearings, in which an outer race and an inner race are rotated relative to each other through balls, are preferably used as the first bearing 241 and the second bearing 242. Instead of the ball bearings, it is also possible to use other types of bearings, e.g., oil-impregnated sintered bearings. The number of bearings defining the bearing unit 24 may be single or may be three or more.

The outer races of the first bearing 241 and the second bearing 242 are fixed to the radial inner surface of the bearing holder 23. More specifically, the outer circumferential surfaces of the outer races make contact with the radial inner surfaces of the holder recess portions 42. On the other hand, the inner races of the first bearing 241 and the second bearing 242 are fixed to the shaft 31.

As shown in FIG. 2, bearings having an equal outer diameter are preferably used as the first bearing 241 and the second bearing 242 of the present preferred embodiment. This makes it possible to use common bearings as the first bearing 241 and the second bearing 242, thereby enhancing the interchangeability of parts. The radial inner surfaces of the holder recess portions 42 axially extend at a substantially constant diameter from the radial outer position of the first bearing 241 to the radial outer position of the second bearing 242. This makes it possible to easily form the holder recess portions 42 by performing a drawing process.

The spacer 25 is arranged between the first bearing 241 and the second bearing 242. The upper end portion of the spacer 25 makes contact with the outer race of the first bearing 241. The lower end portion of the spacer 25 makes contact with the outer race of the second bearing 242. Consequently, the axial gap between the first bearing 241 and the second bearing 242 is kept constant.

The stator core 26 is fixed to the bearing holder 23 at the upper side of the attachment plate 21. The stator core 26 is preferably formed by axially stacking electromagnetic steel plates such as, for example, silicon steel plates or the like. The stator core 26 preferably includes the annular core-back 261 and a plurality of teeth 262 protruding radially outward from the core-back 261. The stator core 26 includes a second insertion hole 260 arranged radially inward of the core-back 261. The bearing holder 23 is inserted into the second insertion hole 260.

The stator core 26 of the present preferred embodiment is one example of a surrounding member that surrounds the bearing holder 23. The bearing holder 23 is preferably, for example, press-fitted to the radial inner surface of the core-back 261, whereby the stator core 26 is fixed to the radial outer surface of the bearing holder 23.

The teeth 262 are arranged at a substantially equal interval along the circumferential direction. The coil 27 is attached to the teeth 262. The coil 27 is preferably defined by conductive wires wound around the respective teeth 262.

The rotary unit 3 of the present preferred embodiment preferably includes the shaft 31, the rotor holder 32, and a magnet 33.

The shaft 31 is preferably a columnar member extending along the center axis 9. The shaft 31 is preferably made of metal, e.g., stainless steel. The shaft 31 is supported by the bearing unit 24 and is rotated about the center axis 9. The upper end portion of the shaft 31 protrudes upward beyond the first bearing 241. The lower end portion of the shaft 31 protrudes downward beyond the second bearing 242. The lower end portion of the shaft 31 is preferably connected to a drive unit of an office automation device through a power transmission mechanism such as, for example, gears or the like.

The rotor holder 32 is preferably a metal-made member rotating together with the shaft 31. The rotor holder 32 preferably includes a top plate portion 321 and a cylindrical portion 322. The top plate portion 321 is arranged above the coil 27 and extends in a substantially planar shape. The inner circumferential section of the top plate portion 321 is fixed to the upper end portion of the shaft 31. The cylindrical portion 322 extends downward from the outer peripheral section of the top plate portion 321 in a cylindrical shape.

The magnet 33 is fixed to the inner circumferential surface of the cylindrical portion 322 of the rotor holder 32. The magnet 33 is preferably rotated together with the shaft 31 and the rotor holder 32. For example, a ferrite magnet or a neodymium magnet is preferably used as the magnet 33. The magnet 33 of the present preferred embodiment preferably has an annular shape. The inner circumferential surface of the magnet 33 is radially opposed to the teeth 262 of the stator core 26. The inner circumferential surface of the magnet 33 is alternately magnetized with N-poles and S-poles along the circumferential direction.

A plurality of magnets may be used in place of the annular magnet 33. In that case, the magnets may be arranged along the circumferential direction so that the magnetic pole surfaces of N-pole and the magnetic pole surfaces of S-pole are alternately arranged side by side.

If a drive current is applied to the coil 27 through the circuit board 22, radial magnetic fluxes are generated in the respective teeth 262 of the stator core 26. Torque acting in the circumferential direction is generated by the magnetic interaction between the teeth 262 and the magnet 33. As a result of the torque acting in the circumferential direction, the rotary unit 3 is rotated about the center axis 9 with respect to the stationary unit 2. As the rotary unit 3 rotates, the power is preferably transmitted to a drive unit connected to the shaft 31.

Figure 5:
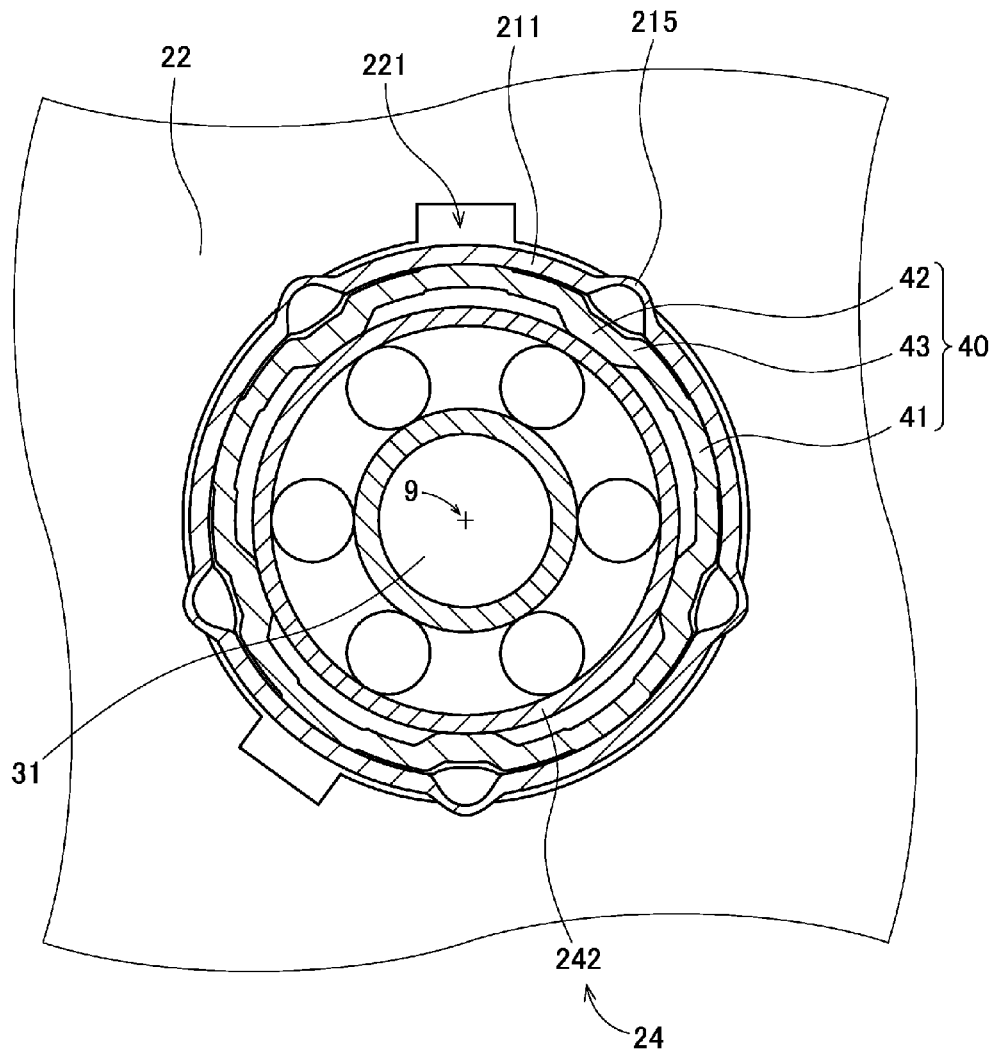
FIG. 5 is a partial horizontal section view of the motor according to the second preferred embodiment of the present invention.

Next, description will be made of the detailed fixing structure of the attachment plate 21, the bearing holder 23, and the bearing unit 24. FIG. 5 is a partial horizontal sectional view of the motor 1 showing the burring portion 211 and its vicinity. In FIG. 5, for the sake of easier understanding of the fixing structure, the burring portion 211, the tubular portion 40 of the bearing holder 23, and the second bearing 242 are depicted in the same plane.

As shown in FIG. 5, the burring portion 211 of the attachment plate 21 preferably includes a plurality of caulking sections 215. Each of the caulking sections 215 is plastically deformed radially outward beyond the remaining section of the burring portion 211. The lower surface of each of the caulking sections 215 preferably makes contact with an upper surface or the end edge portion of the circuit board 22. Consequently, the circuit board 22 is interposed and fixed between the inner flat portion 212 of the attachment plate 21 and the caulking sections 215.

In the motor 1, the attachment plate 21 and the circuit board 22 are fixed together using the caulking sections 215 defined in the attachment plate 21. This makes it possible to reduce the number of parts of the motor 1. As compared with a case where a screw fixing work is carried out, it is possible to shorten the steps of fixing the attachment plate 21 and the circuit board 22 together. The burring portion 211 and the caulking sections 215 are provided around the first insertion hole 210 of the attachment plate 21. Thus, the attachment plate 21 and the circuit board 22 are fixed together in a manner such that an electronic-part mounting area of the circuit board 22 is not limited or only limited to an insignificant extent.

As shown in FIG. 5, the radial inner surfaces of the caulking sections 215 protrude radially inward beyond the remaining sections of the inner circumferential surface of the burring portion 211. The caulking sections 215 are arranged radially outward of the holder recess portions 42. For that reason, radial gaps are present between the radial inner surfaces of the caulking sections 215 and the holder recess portions 42. This prevents the caulking sections 215 and the bearing holder 23 from making contact with each other. As a result, it is possible to prevent deformation of the bearing holder 23 and the resultant distortion of the bearing unit 24.

Figure 6:
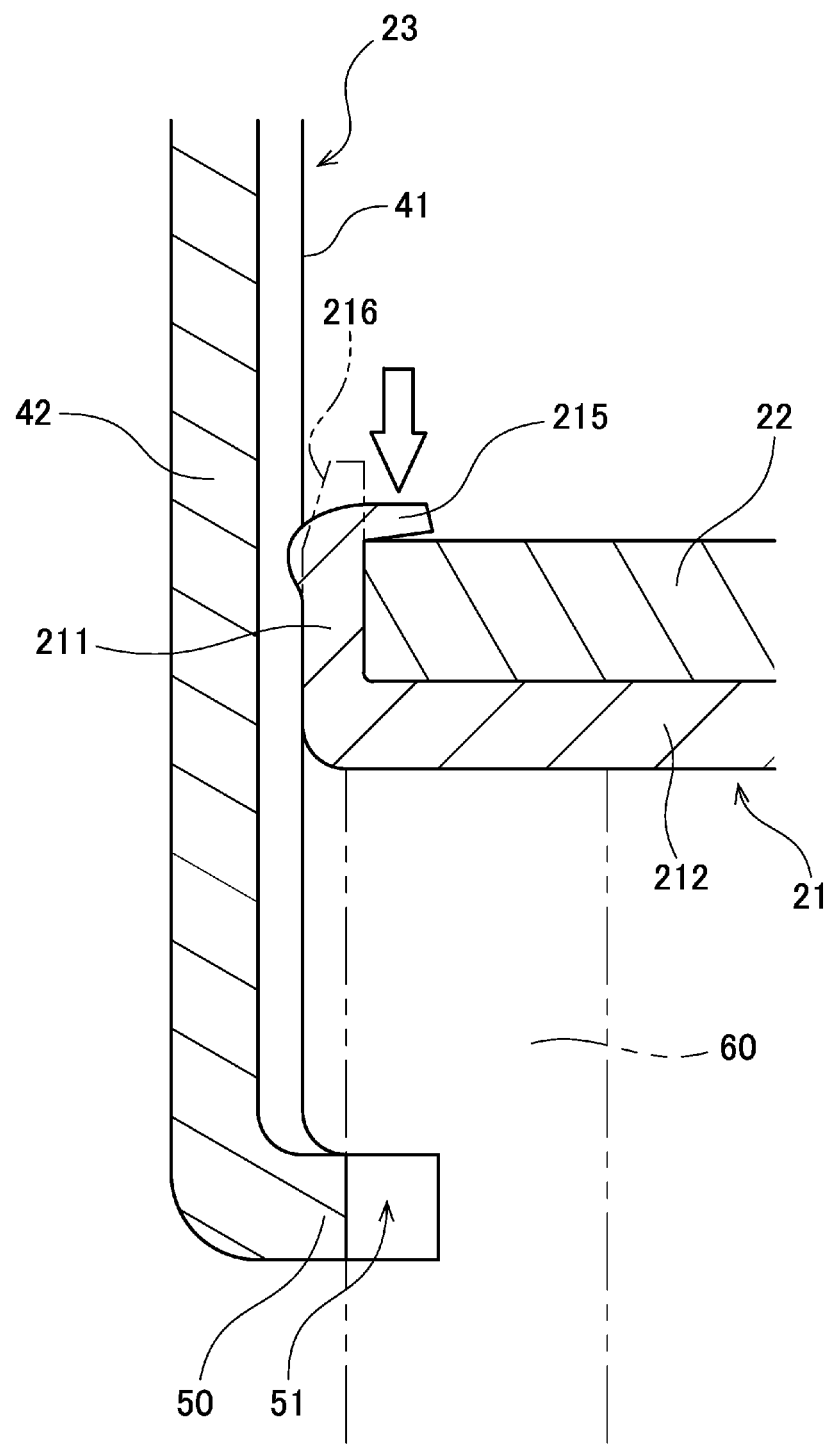
FIG. 6 is a partial vertical section view of the motor according to the second preferred embodiment of the present invention.

FIG. 6 is a partial vertical section view of the motor 1 showing the burring portion 211 and its vicinity. In FIG. 6, the burring portion 211 not yet subjected to caulking and a jig 60 arranged to support the attachment plate 21 during caulking are indicated by double-dot chain lines. As shown in FIGS. 2, 3, and 6, a plurality of first cutouts 51 is provided in the flange portion 50 of the bearing holder 23. Each of the first cutouts 51 axially extends through the flange portion 50. The first cutouts 51 are positioned radially outward of the lower end sections of the holder recess portions 42. Therefore, as shown in FIG. 6, the first cutouts 51 are positioned below the caulking sections 215.

When caulking the burring portion 211, the jig 60 is preferably first inserted into the first cutouts 51. Then, the upper surface of the jig 60 is brought into contact with the lower surface of the inner flat portion 212 of the attachment plate 21.

Thus, the attachment plate 21 is supported on the jig 60. Next, as indicated by a white arrow in FIG. 6, a pressure is applied to the burring portion 211 from above. As a consequence, the burring portion 211 is partially plastically deformed radially outward, thereby forming the caulking sections 215.

As indicated by double-dot chain lines in FIG. 6, the burring portion 211 of the present preferred embodiment preferably includes a taper surface 216. The taper surface 216 is arranged between the upper end section and the inner circumferential surface of the burring portion 211. The taper surface 216 obliquely extends with respect to the axial direction and the radial direction. When forming the caulking sections 215, a load is applied to the taper surface 216. Thus, the burring portion 211 is plastically deformed radially inward with ease. Moreover, the caulking sections 215 are preferably prevented from swelling radially outward. This prevents the caulking sections 215 and the bearing holder 23 from making contact with each other.

As shown in FIG. 5, the circuit board 22 of the present preferred embodiment is preferably provided with two second cutouts 221. The second cutouts 221 lie between the caulking sections 215 and axially extend through the circuit board 22. When press-fitting the bearing holder 23 to the attachment plate 21, a jig (not shown) is inserted through the second cutouts 221. Then, the bearing holder 23 is press-fitted while supporting the upper surface of the attachment plate 21 with the jig.

Figure 7:
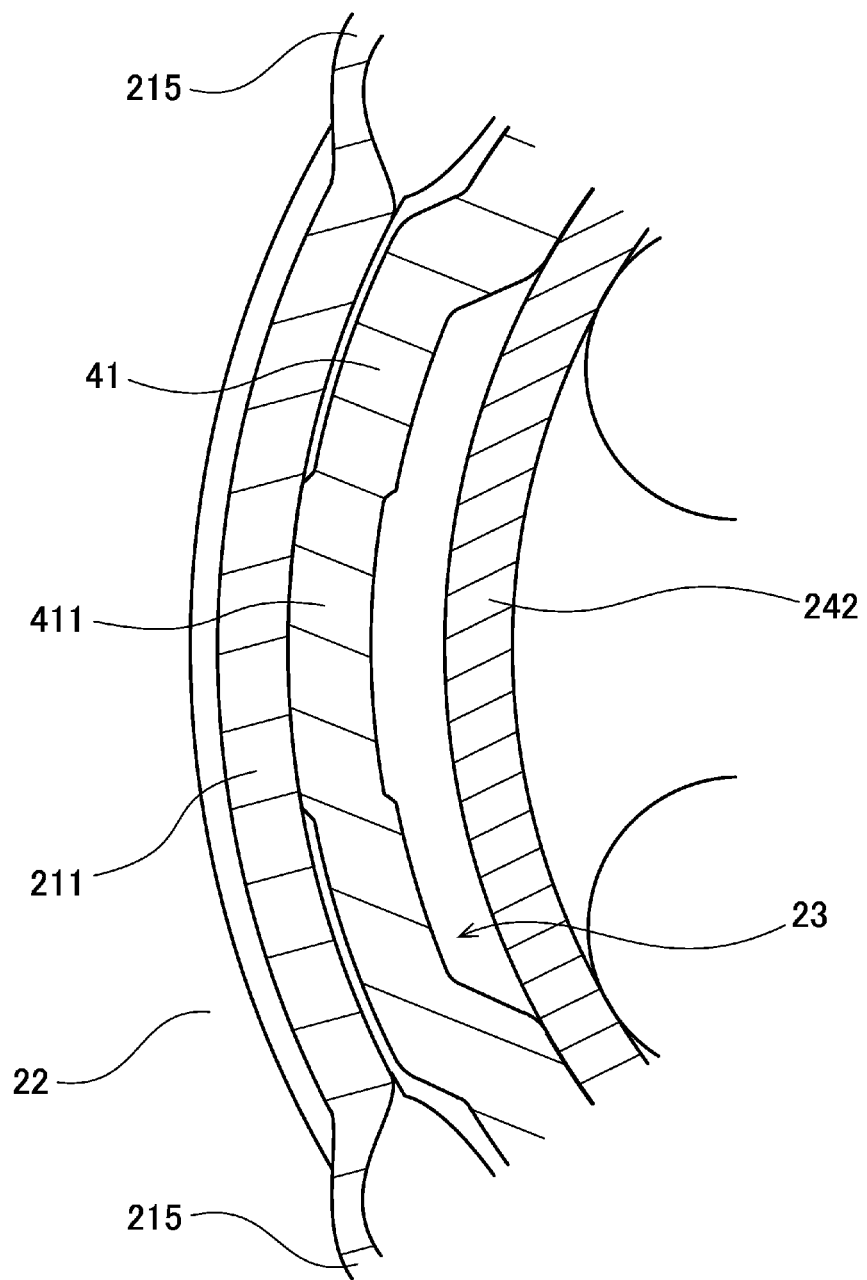
FIG. 7 is a partial horizontal section view of the motor according to the second preferred embodiment of the present invention.

FIG. 7 is a partial horizontal section view of the motor 1 showing the holder protrusion portions 41 and their vicinities. In FIG. 7, for the sake of easier understanding of the fixing structure, the burring portion 211, the bearing holder 23, and the second bearing 242 are depicted in the same plane.

As shown in FIG. 7, each of the holder protrusion portions 41 preferably includes a secondary protrusion section 411 protruding radially outward. The radial outer surface of the secondary protrusion section 411 protrudes radially outward beyond the radial outer surface of the remaining section of each of the holder protrusion portions 41. The radial outer surface of the secondary protrusion section 411 makes contact with the inner circumferential surface of the burring portion 211. Consequently, the contact portions between the holder protrusion portions 41 and the burring portion 211 are made narrow.

In the present preferred embodiment, as set forth above, only the secondary protrusion section 411 of each of the holder protrusion portions 41 makes contact with the burring portion 211. Thus, the displacement generated in each of the holder protrusion portions 41 due to the contact is concentrated on the secondary protrusion section 411. If the displacement of each of the holder protrusion portions 41 is concentrated on the secondary protrusion section 411, the stresses transferred to the holder recess portions 42 get reduced. As a consequence, it is possible to prevent deformation of the holder recess portions 42 and the resultant distortion of the bearing unit 24.

It is desirable that the secondary protrusion section 411 be positioned at the circumferential center of each of the holder protrusion portions 41. This enables the displacement of each of the holder protrusion portions 41 to concentrate on the circumferential central region. Accordingly, it is possible to prevent stresses from being transferred to the holder recess portions 42.

Figure 8:
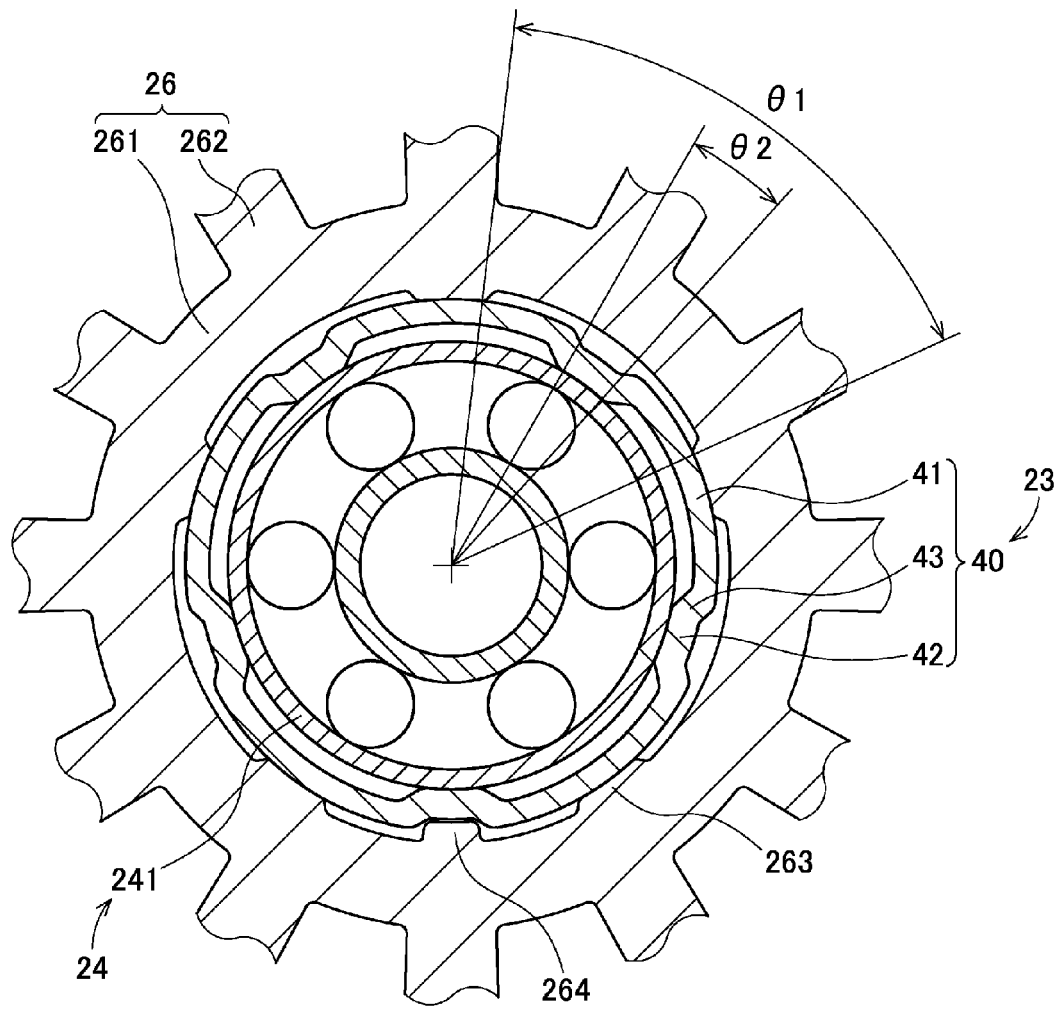
FIG. 8 is a partial horizontal section view of the motor according to the second preferred embodiment of the present invention.

Next, a description will be made of the detailed fixing structure of the stator core 26, the bearing holder 23, and the bearing unit 24. FIG. 8 is a partial horizontal sectional view of the motor 1 showing the core-back 261 and its vicinity. In FIG. 8, for the sake of easier understanding of the fixing structure, the contact portions between the bearing holder 23 and the core-back 261 and the contact portions between the bearing holder 23 and the first bearing 241 are depicted on the same plane.

As shown in FIG. 8, the central angle of the portion of the inner circumferential surface of the core-back 261 remaining out of contact with each of the holder protrusion portions 41 is defined as $\theta 1$. The central angle of the portion of the outer circumferential surface of the first bearing 241 making contact with each of the holder recess portions 42 is defined as $\theta 2$. In the motor 1, the central angle $\theta 1$ is preferably equal to or larger than the central angle $\theta 2$. For that reason, the contact portions between the holder protrusion portions 41 and the core-back 261 do not radially overlap with the contact portions between the holder recess portions 42 and the first bearing 241. In other words, the circumferential positions of the contact portions between the holder protrusion portions 41 and the core-back 261 do not overlap with the circumferential positions of the contact portions between the holder recess portions 42 and the first bearing 241.

With this structure, stresses are not, or are only barely transferred from the contact portions between the holder protrusion portions 41 and the core-back 261 to the contact portions between the holder recess portions 42 and the first bearing 241. Accordingly, even if the holder protrusion portions 41 are pushed radially inward by, for example, a press-fitting work, deformation of bores of the holder recess portions 42 and any resultant distortion of the bearing unit 24 are not likely to occur.

In particular, the stator core 26 of the present preferred embodiment preferably includes a plurality of press-fit protrusion portions 263. Each of the press-fit protrusion portions 263 protrudes radially inward from the inner circumferential surface of the core-back 261. The press-fit protrusion portions 263 are arranged at a substantially equal interval along the circumferential direction. The circumferential width of the radial inner surface of each of the press-fit protrusion portions 263 is smaller than the circumferential width of the radial outer surface of each of the holder protrusion portions 41. Among the inner circumferential surfaces of the core-back 261, only the radial inner surfaces of the press-fit protrusion portions 263 make contact with the holder protrusion portions 41.

This arrangement limits the circumferential width of the contact portions between the stator core 26 and the holder protrusion portions 41. The radial inward displacement of the holder protrusion portions 41 caused by a press-fit load is concentrated on the contact portions. This prevents stresses from being transferred to the holder recess portions 42. As a consequence, it is possible to prevent deformation of the holder recess portions 42 and the resultant distortion of the bearing unit 24.

The stator core 26 of the present preferred embodiment preferably includes a positioning protrusion portion 264 in addition to the press-fit protrusion portions 263. The positioning protrusion portion 264 protrudes radially inward from the inner circumferential surface of the core-back 261. The positioning protrusion portion 264 protrudes further radially inward than the press-fit protrusion portions 263. Thus, the radial inner end of the positioning protrusion portion 264 is positioned more radially inward than the outer circumferential surfaces of the holder protrusion portions 41. The positioning protrusion portion 264 is arranged between the holder protrusion portions 41 adjoining to each other. That is to say, the positioning protrusion portion 264 is preferably fitted to a groove located on the radial outer surface of each of the holder recess portions 42. Therefore, the bearing holder 23 is circumferentially positioned with respect to the stator core 26.

The circumferential width of the positioning protrusion portion 264 is preferably smaller than the circumferential width of each of the holder recess portions 42. On the other hand, as shown in FIG. 8, the circumferential width of protrusion portions other than the positioning protrusion portion 264 arranged on the inner circumferential surface of the stator core 26 is larger than the circumferential width of the holder recess portions 42. Among the protrusion portions arranged on the inner circumferential surface of the stator core 26, only the positioning protrusion portion 264 can be fitted to one of the holder recess portions 42. Accordingly, this makes it easy to perform a positioning work when, for example, press-fitting the bearing holder 23 to the stator core 26.

Figure 9:
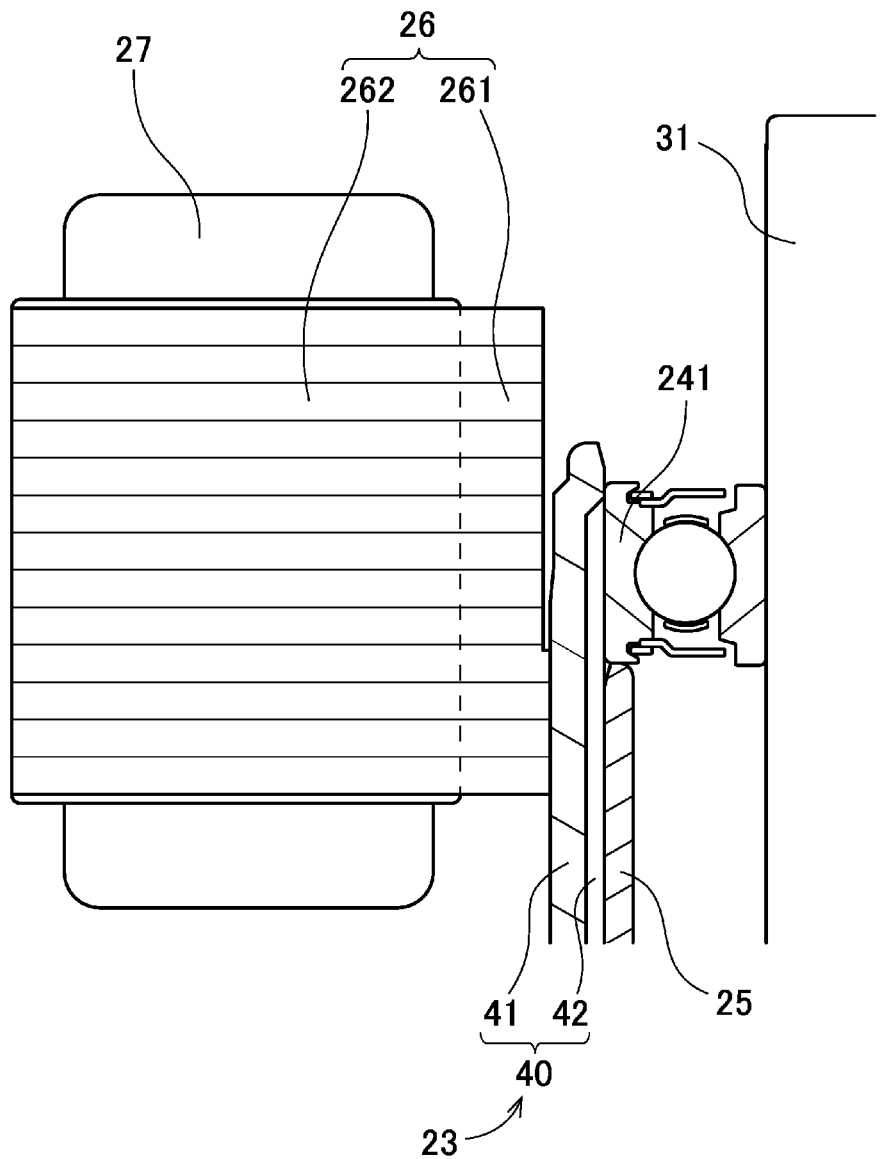
FIG. 9 is a partial vertical section view of the motor according to the second preferred embodiment of the present invention.

FIG. 9 is a partial vertical sectional view of the motor 1 showing the first bearing 241 and its vicinity. In the present preferred embodiment, as shown in FIG. 9, the axial positions of the contact portions between the holder protrusion portions 41 and the core-back 261 differ from the axial positions of the contact portions between the holder recess portions 42 and the first bearing 241. For that reason, stresses are not transferred, or are only barely transferred from the contact portions between the holder protrusion portions 41 and the core-back 261 to the contact portions between the holder recess portions 42 and the first bearing 241. As a consequence, it is possible to significantly reduce and prevent deformation of bores of the holder recess portions 42 and the resultant distortion of the bearing unit 24.

Third Preferred Embodiment

Figure 10:
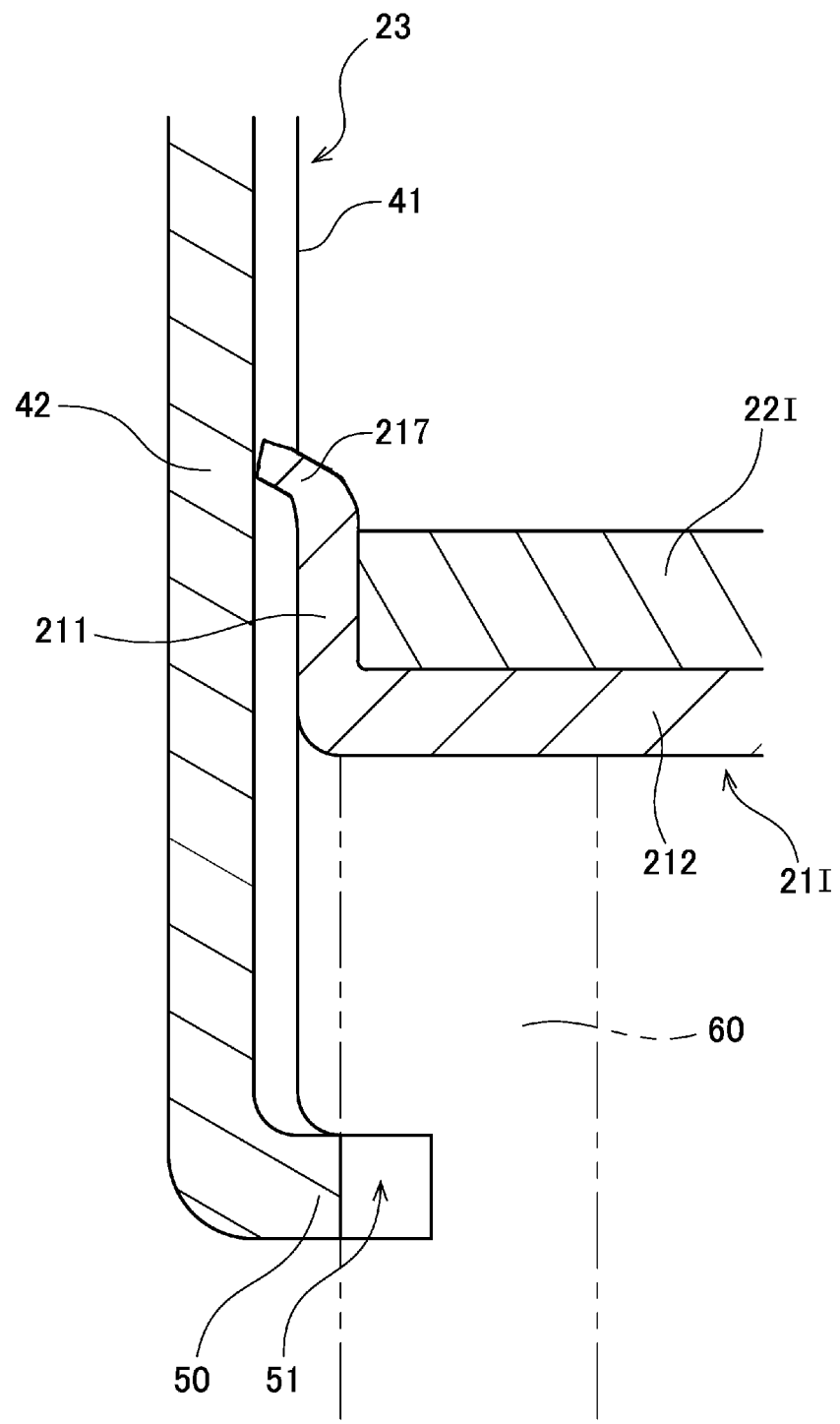
FIG. 10 is a partial horizontal section view showing a motor according to a third preferred embodiment of the present invention.
Figure 11:
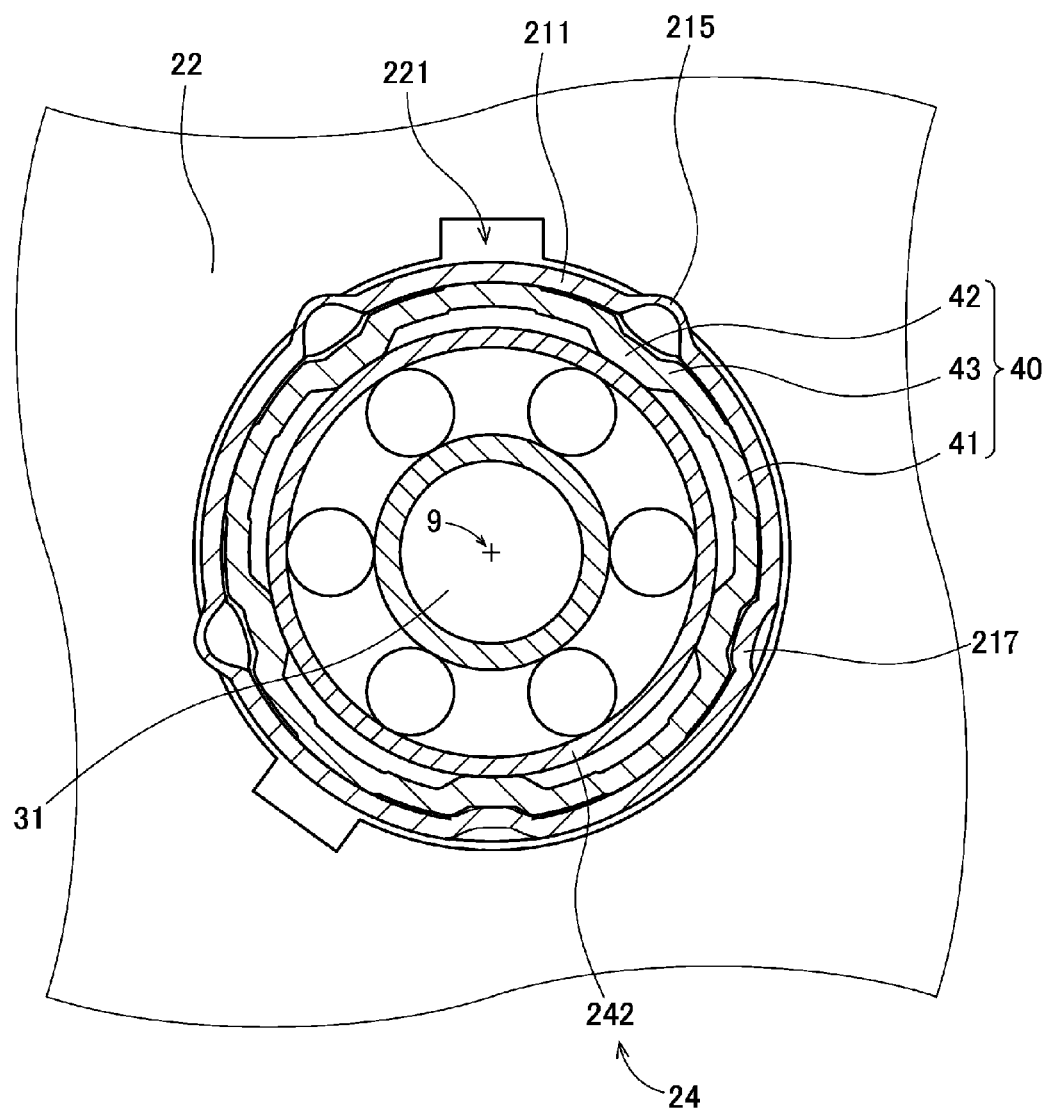
FIG. 11 is a partial vertical section view of the motor according to the third preferred embodiment of the present invention.
Figure 12:
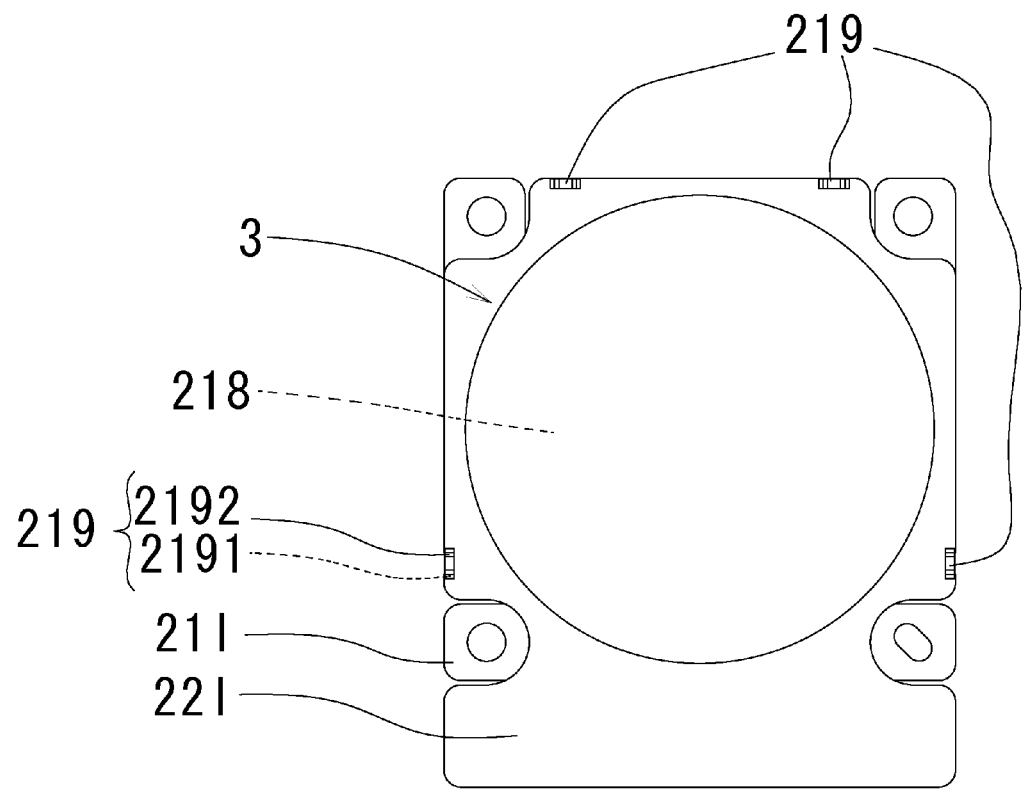
FIG. 12 is a plan view of the motor according to the third preferred embodiment of the present invention.
Figure 13:
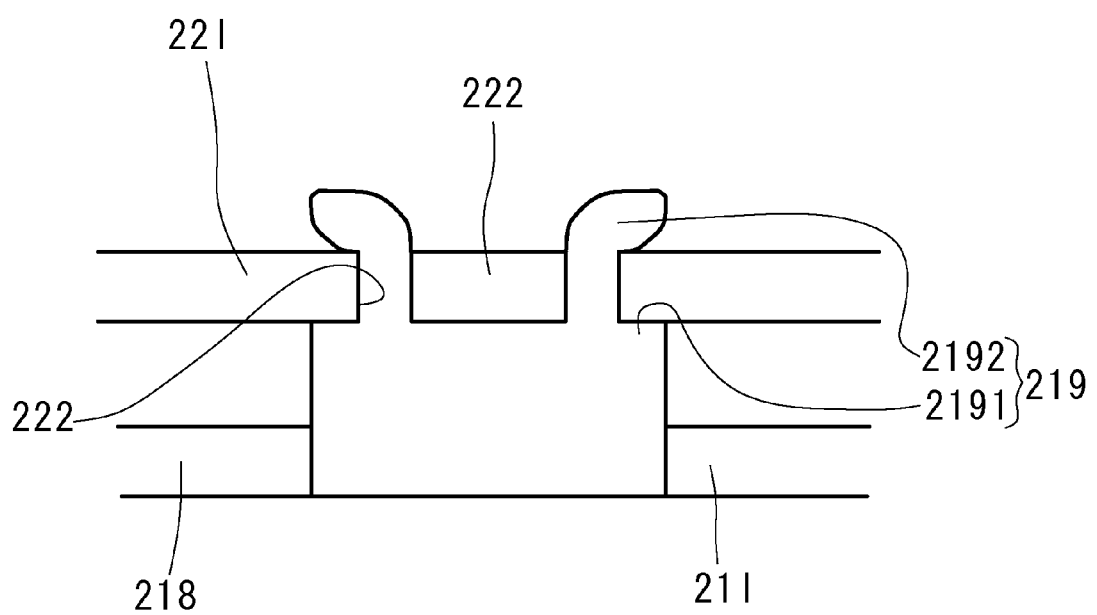
FIG. 13 is an enlarged front view showing a fixing portion of the motor according to the third preferred embodiment of the present invention.

FIG. 10 is a partial horizontal sectional view of a motor 1 according to a third preferred embodiment of the present invention, showing a burring portion 211 and its vicinity. FIG. 11 is a partial vertical sectional view of the motor 1 according to the third preferred embodiment. FIG. 12 is a plan view of the motor 1 according to the third preferred embodiment. FIG. 13 is an enlarged front view showing a fixing portion 219 of the motor 1 according to the third preferred embodiment. The following description will be centered on the points differing from the second preferred embodiment.

As shown in FIGS. 10 and 11, the burring portion 211 of the attachment plate 21 includes a plurality of caulking sections 215. In the present preferred embodiment, the number of the caulking sections 215 is preferably three, for example. Each of the caulking sections 215 is plastically deformed radially outward beyond the remaining section of the burring portion 211. The lower surface of each of the caulking sections 215 makes contact with upper surface or the end edge portion of the circuit board 22. Consequently, the circuit board 22 is interposed and fixed between the inner flat portion 212 of the attachment plate 21 and the caulking sections 215.

As shown in FIG. 10, the burring portion 211 of the attachment plate 21 preferably includes one or more rotation-preventing sections 217. In the present preferred embodiment, the number of the rotation-preventing sections 217 is preferably two. The respective rotation-preventing sections 217 overlap with the holder recess portions 42 in the circumferential positions. The respective rotation-preventing sections 217 are positioned radially inward of the holder protrusion portions 41. The respective rotation-preventing sections 217 make contact with the holder recess portions 42. Alternatively, the respective rotation-preventing sections 217 may not make contact with the holder recess portions 42 but may radially oppose to the holder recess portions 42.

In the present preferred embodiment, the respective rotation-preventing sections 217 are preferably formed, for example, by plastically deforming the burring portion 211 radially inward.

Due to the formation of the rotation-preventing sections 217, it is possible to prevent the circumferential positions of the attachment plate 21 and the bearing holder 23 from moving relative to each other when a circumferential force acts on the bearing holder 23 with respect to the attachment plate 21. Moreover, the relative movement of the circumferential positions of the attachment plate 21 and the bearing holder 23 can be prevented without additional components. The caulking sections 215 and the rotation-preventing sections 217 can preferably be formed through the same process. In other words, the rotation-preventing sections 217 can be formed by plastically deforming certain portions of the burring portion 211 radially inward and not radially outward when caulking the burring portion 211. In addition, if the burring portion 211 is plastically deformed so that the rotation-preventing sections 217 and the bearing holder 23 can make contact with each other, it is possible to prevent the relative movement of the circumferential positions of the attachment plate 21 and the bearing holder 23. In case where the rotation-preventing sections 217 are provided in plural numbers, the respective rotation-preventing sections 217 may be arranged in a mutually adjoining relationship as in the present preferred embodiment or the caulking sections 215 may be arranged between the rotation-preventing sections 217.

As shown in FIG. 12, the attachment plate 21I of the present preferred embodiment includes a flat base portion 218 and a plurality of fixing portions 219 axially extending from the base portion 218 toward the circuit board 22I. The base portion 218 preferably includes the inner flat portion 212, the transition portion 213, and the outer flat portion 214. In the present preferred embodiment, the base portion 218 need not include the transition portion 213. In other words, the inner flat portion 212 and the outer flat portion 214 may exist on the same plane, if so desired.

As shown in FIG. 13, the fixing portions 219 preferably extend axially upward from the outer flat portion 214 of the base portion 218, namely toward the circuit board 22I. In the present preferred embodiment, the fixing portions 219 are preferably provided at four points, for example. However, the number of the fixing portions 219 may alternatively be one, two, three, five, or more than five. In the present preferred embodiment, the plan-view shape of the circuit board 22I is preferably rectangular and the number of the fixing portions 219 is preferably four, for example.

Each of the fixing portions 219 preferably includes a support section 2191 and a pair of protrusion sections 2192 extending axially upward from the support section 2191. The support section 2191 of each of the fixing portions 219 preferably includes a support surface making contact with the circuit board 22I on the same plane. Preferably, the support section 2191 includes a support surface perpendicular or substantially perpendicular to the axial direction. In the present preferred embodiment, the support section 2191 is arranged outside the protrusion sections 2192. The protrusion sections 2192 are preferably provided as a pair and extend axially upward from the inner region of the support section 2191. While the foregoing description recites that "the fixing portions 219 extend axially upward from the base portion 218 toward the circuit board 22I", it is also true that the protrusion sections 2192 of the fixing portions 219 protrude axially upward beyond the circuit board 22I.

The circuit board 22I preferably includes a plurality of depressions 222 defined in the outer edge thereof. In the present preferred embodiment, each of the depressions 222 preferably has a substantially U-like shape dented inward from the outer edge when seen in a plan view. In the present preferred embodiment, the depressions 222 are preferably provided at four points, for example. The depressions 222 are arranged in the positions corresponding to the fixing portions 219. In other words, the depressions 222 are arranged in an overlapping relationship with the fixing portions 219 when seen in a plan view.

The upper surfaces of the support sections 2191 of the fixing portions 219 of the attachment plate 21I preferably make contact with the lower surface of the circuit board 22I. The protrusion sections 2192 extend through the depressions 222 of the circuit board 22I and make contact with the upper surface of the circuit board 22I. In the present preferred embodiment, each of the fixing portions 219 preferably includes two protrusion sections 2192. Each of the protrusion sections 2192 is bent to lie on the edge of each of the depressions 222. Each of the protrusion sections 2192 is bent in the direction perpendicular or substantially perpendicular to the open direction of the depressions 222 when seen in a plan view, thereby making contact with the upper surface of the circuit board 22I. It is not necessary that all the fixing portions 219 have two protrusion sections 2192.

Since stresses are applied to the regions of the circuit board 22I around the protrusion sections 2192, a wiring pattern may possibly be disconnected. Accordingly, it is preferred that the wiring pattern is not arranged in the regions of the circuit board 22I around the protrusion sections 2192. In the present preferred embodiment, the circuit board 22I is provided with the depressions 222. Therefore, as compared with a case where the protrusion sections 2192 extend through through-holes, it is possible to fix the circuit board 22I to the stationary unit 2 without having to reduce the wiring space of the circuit board 22I. Since the protrusion sections 2192 are bent to lie on the edges of the depressions 222, it is possible to prevent the circuit board 22I from moving in the plane direction with respect to the attachment plate 21I. Since the protrusion sections 2192 are bent in the direction perpendicular or substantially perpendicular to the open direction of the depressions 222 when seen in a plan view, it is possible to, despite the formation of the depressions 222, prevent the circuit board 22I from moving in the plane direction with respect to the attachment plate 21I.

In the present preferred embodiment, the shape of the depressions 222 is not limited to the U-like shape but may be changed to an E-like shape, an arc shape, or any other desirable shapes.

Insertion holes axially extending through the circuit board 22I may be provided in place of the depressions 222. The protrusion sections 2192 may extend through the insertion holes and may make contact with the upper surface of the circuit board 22I (the opposite surface of the circuit board 22I from the attachment plate 21I).

Some of the fixing portions may have only the support sections and other fixing portions may have only the protrusion sections.

In the present preferred embodiment, the fixing portions 219 may not be formed in the outer flat portion 215 but may be formed in the transition portion 213.

Modified Preferred Embodiments

While some preferred embodiments of the present invention have been described above, the present invention is not limited to the foregoing preferred embodiments.

Figure 14:
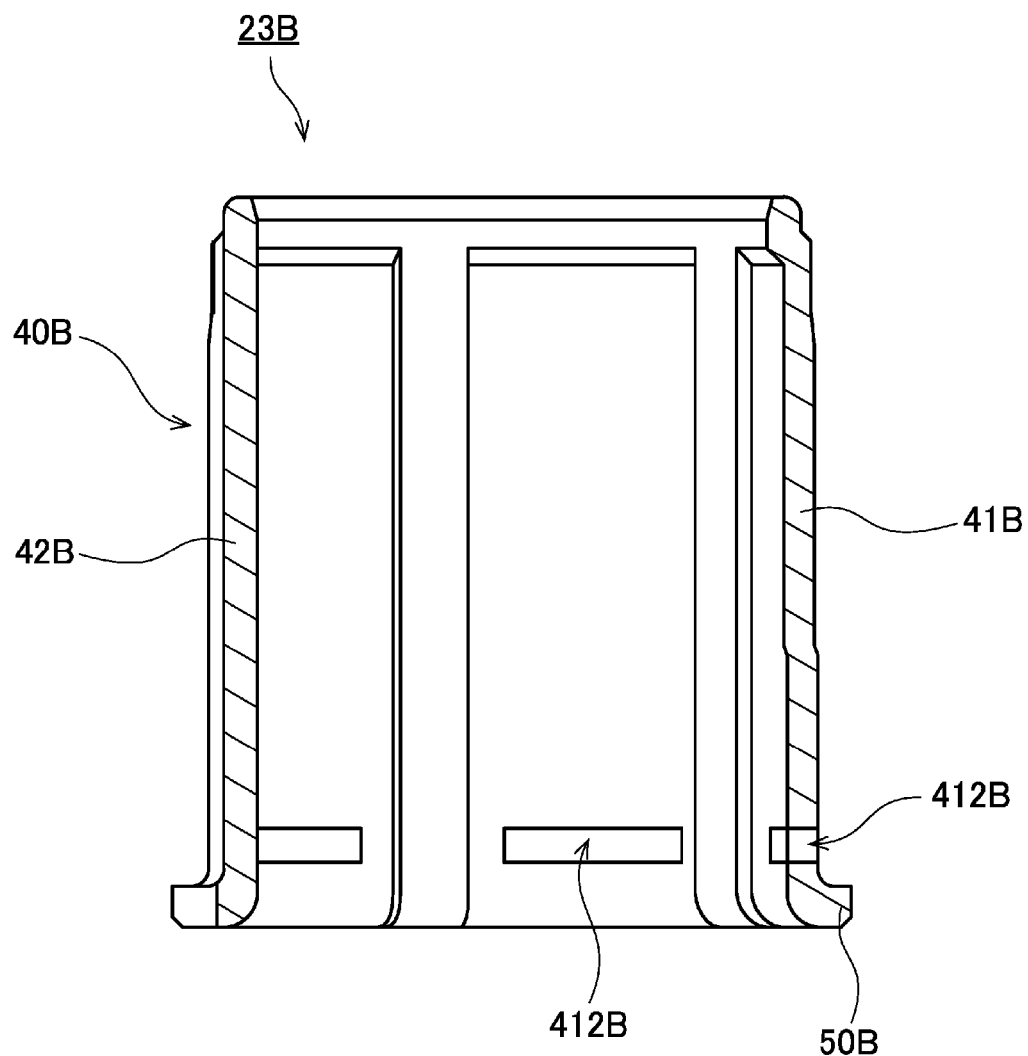
FIG. 14 is a vertical section view showing a bearing holder according to one modified example of a preferred embodiment of the present invention.

FIG. 14 is a vertical sectional view of a bearing holder 23B according to one modified example of a preferred embodiment of the present invention. The bearing holder 23B shown in FIG. 14 preferably includes a flange portion 50B extending radially outward from the lower end section of a tubular portion 40B. Thus, the rigidity of the tubular portion 40B is increased by the flange portion 50B. The bearing holder 23B shown in FIG. 14 preferably includes a plurality of through-holes 412B radially extending through the holder protrusion portions 41B. This enhances the flexibility of the holder protrusion portions 41B at the upper side of the through-holes 412B.

The through-holes 412B are positioned above the flange portion 50. In a state where the bearing holder 23B is press-fitted to the attachment plate and the stator core, the through-holes 412B are positioned lower than the burring portion and the core-back. For that reason, the holder protrusion portions 41B are easily bent radially inward in the contact portion between the burring portion and the core-back. This prevents stresses from being transferred to the holder recess portions 42B.

Figure 15:
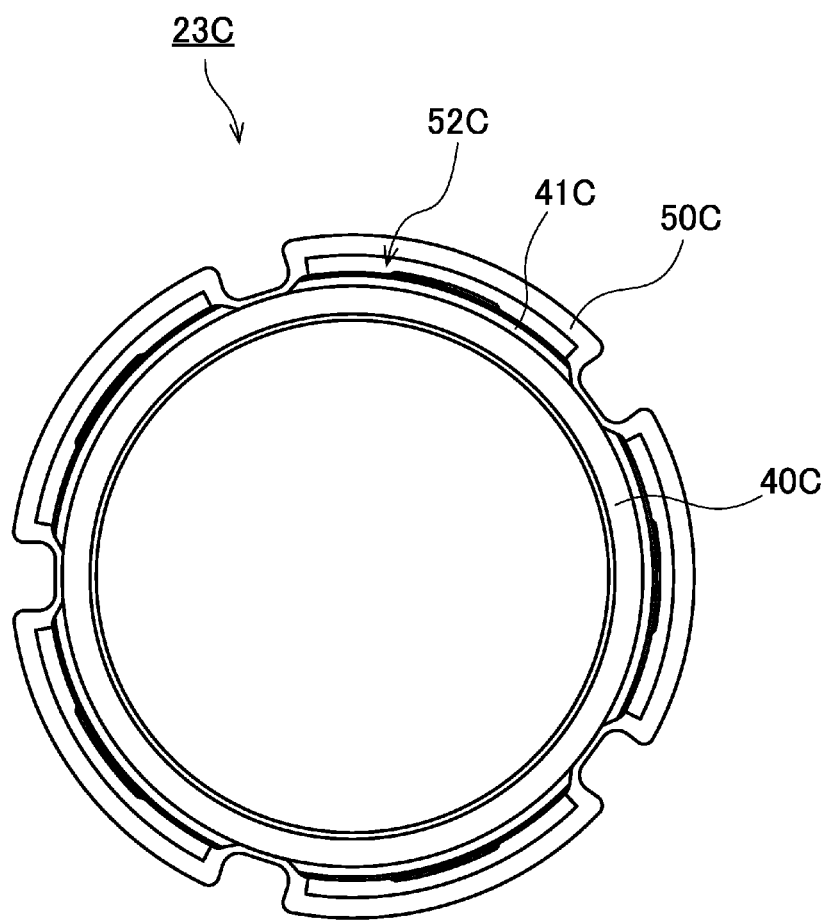
FIG. 15 is a plan view showing a bearing holder according to another modified example of a preferred embodiment of the present invention.

FIG. 15 is a plan view showing a bearing holder 23C according to another modified example of a preferred embodiment of the present invention. The bearing holder 23C shown in FIG. 15 preferably includes a flange portion 50C extending radially outward from the lower end section of a tubular portion 40C. Thus, the rigidity of the tubular portion 40C is increased by the flange portion 50C. The bearing holder 23C shown in FIG. 15 includes a plurality of through-holes 52C axially extending through the flange portion 50C. The circumferential positions of the through-holes 52C overlap with the circumferential positions of the holder protrusion portions 41C. This preferably enhances the flexibility of the holder protrusion portions 41C.

If the flexibility of the holder protrusion portions 41C gets enhanced, the holder protrusion portions 41C are easily bent radially inward in the contact portion between the burring portion and the core-back. This prevents stresses from being transferred to the holder recess portions.

Alternatively, the flange portion may be provided with cutouts in place of the through-holes. In order to further enhance the flexibility of the holder protrusion portions, it is preferred that the through-holes or the cutouts axially extend through the innermost edge of the flange portion. In other words, it is preferred that the radial inner edge surfaces of the through-holes or the cutouts are positioned below the radial outer surfaces of the holder protrusion portions.

Figure 16:
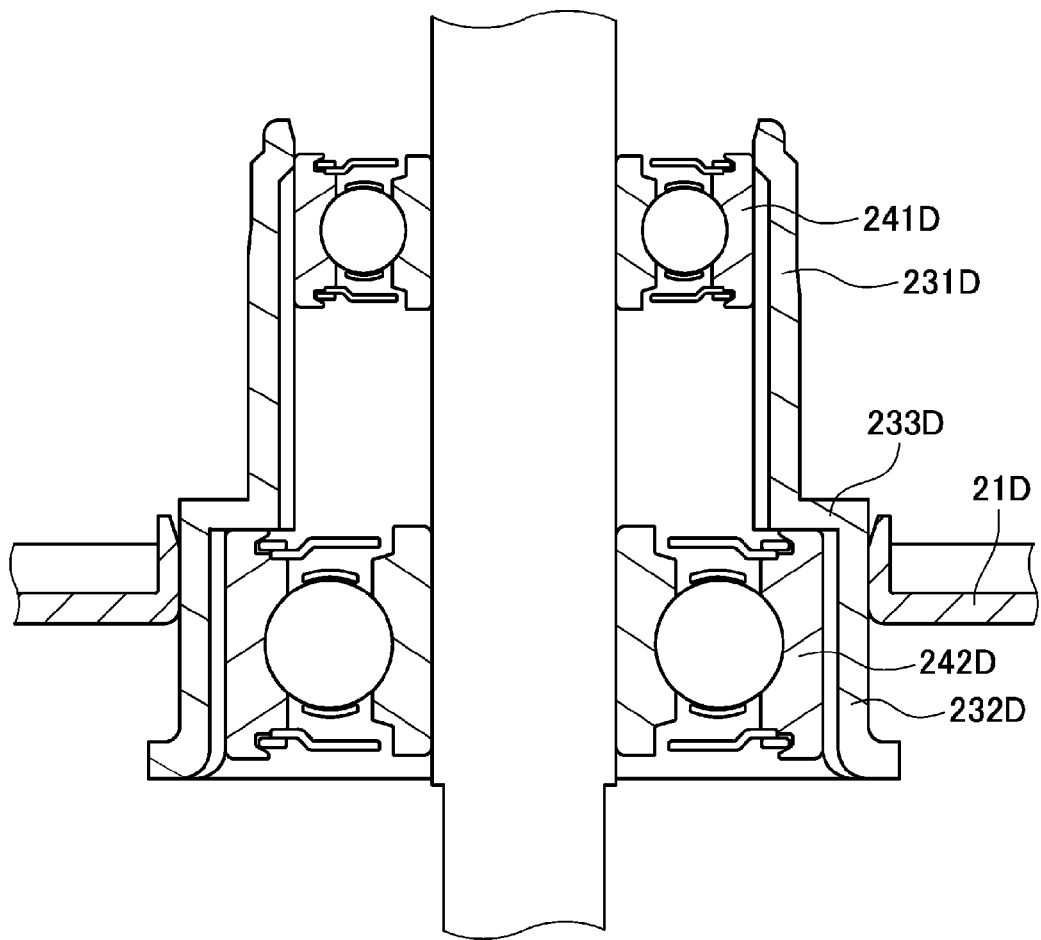
FIG. 16 is a partial vertical section view showing a motor according to a modified example of a preferred embodiment of the present invention.
Figure 17:
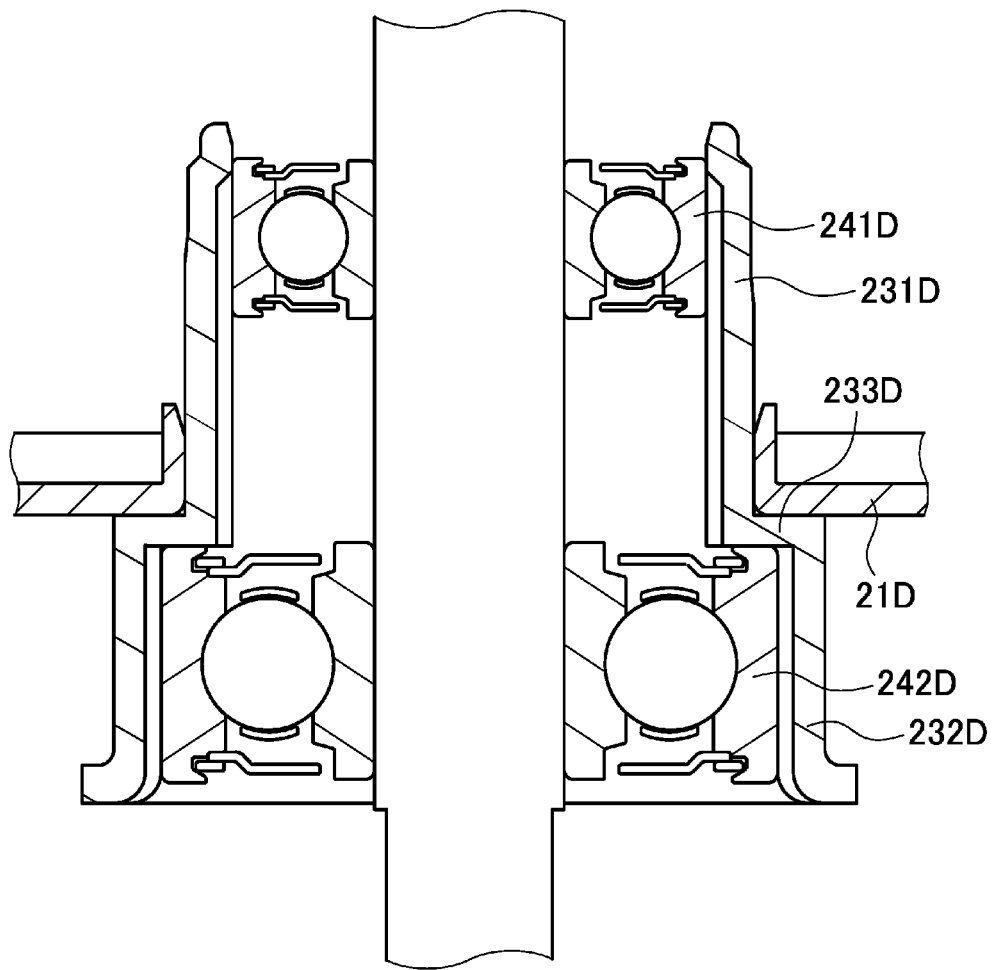
FIG. 17 is a partial vertical section view showing a motor according to another modified example of a preferred embodiment of the present invention.

FIGS. 16 and 17 are partial vertical section views showing motors according to modified examples of a preferred embodiment of the present invention. In the examples shown in FIGS. 16 and 17, the bearing unit preferably includes a first bearing 241D and a second bearing 242D larger in outer diameter than the first bearing 241D. The bearing holder preferably includes a small-diameter portion 231D and a large-diameter portion 232D larger in diameter than the small-diameter portion 231D. The first bearing 241D is preferably held in the small-diameter portion 231D and the second bearing 242D is preferably held in the large-diameter portion 232D. If the outer diameters of the upper and lower bearings are set differently in this manner, it becomes possible to cope with the support forces required in the upper and lower portions of the bearing unit.

The bearing holder shown in FIGS. 16 and 17 preferably further includes a ring-shaped disc portion 233D provided between the small-diameter portion 231D and the large-diameter portion 232D. The disc portion 233D interconnects the end of the small-diameter portion 231D near the large-diameter portion 232D and the end of the large-diameter portion 232D near the small-diameter portion 231D. In the example shown in FIG. 17, the lower surface of the attachment plate 21D makes contact with the upper surface of the disc portion 233D. This makes it possible to axially position the attachment plate 21D with ease.

In the examples shown in FIGS. 16 and 17, the second bearing 242D and the large-diameter portion 232D are positioned below the first bearing 241D and the small-diameter portion 231D. Alternatively, the second bearing 242D and the large-diameter portion 232D may be positioned above the first bearing 241D and the small-diameter portion 231D.

Figure 18:
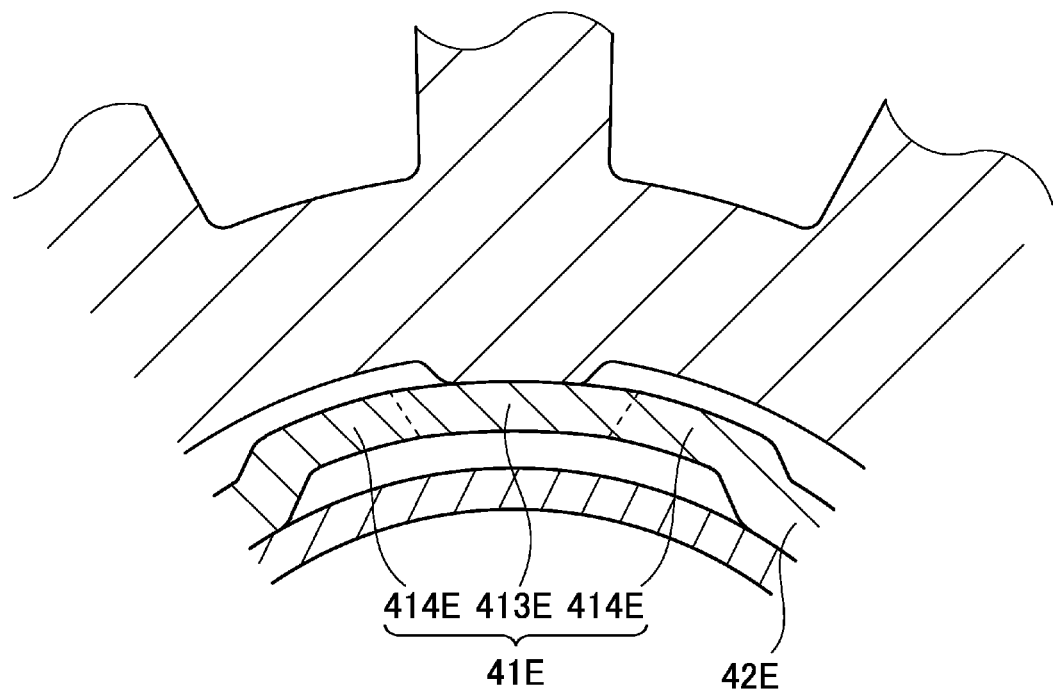
FIG. 18 is a partial horizontal section view showing a motor according to a further modified example of a preferred embodiment of the present invention.
Figure 18:
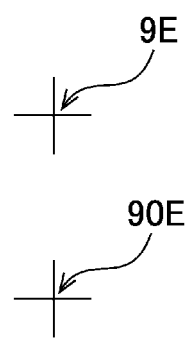

FIG. 18 is a partial horizontal section view showing a motor according to a further modified example of a preferred embodiment of the present invention. In the example shown in FIG. 18, the curvature of a circumferential center section 413E of each of the holder protrusion portions 41E differs from the curvature of circumferential opposite end sections 414E of each of the holder protrusion portions 41E. More specifically, the curvature center 90E of the circumferential center section 413E is arranged in a position deviated from the center axis 9E. Thus, the curvature radius of the circumferential center section 413E of each of the holder protrusion portions 41E is larger than the distance between the circumferential center section 413E and the center axis 9E. This further enhances the flexibility of the circumferential center section 413E of each of the holder protrusion portions 41E. Accordingly, it is possible to prevent stresses from being transferred to the holder recess portions 42E.

Figure 19:
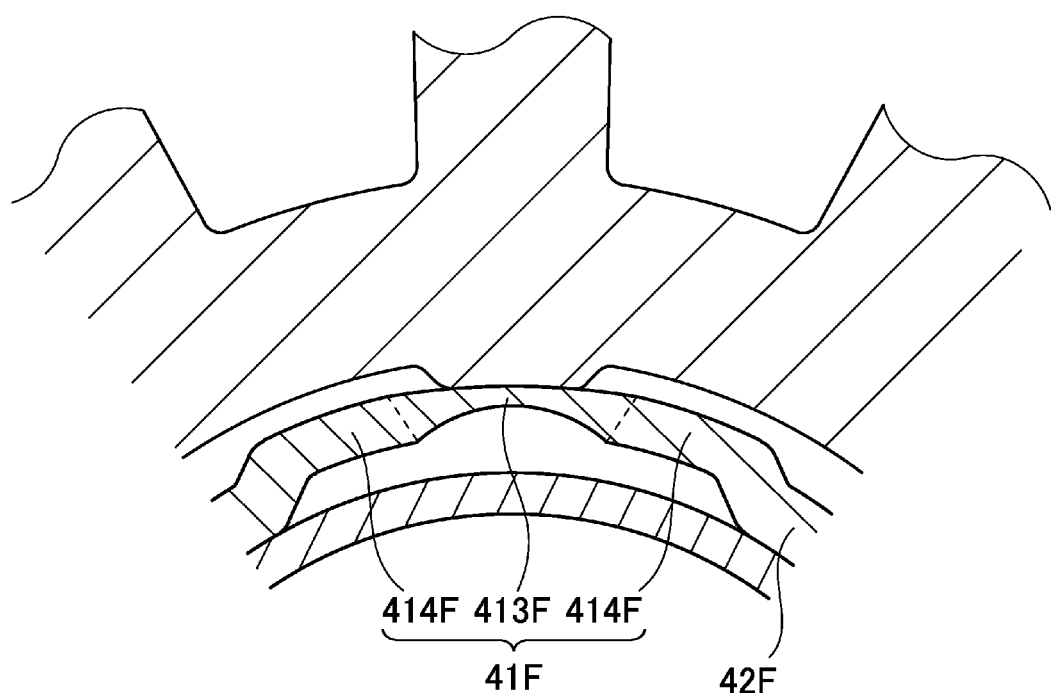
FIG. 19 is a partial horizontal section view showing a motor according to a still further modified example of a preferred embodiment of the present invention.

FIG. 19 is a partial horizontal section view showing a motor according to a still further modified example of a preferred embodiment of the present invention. In the example shown in FIG. 19, the radial thickness of the circumferential center section 413F of each of the holder protrusion portions 41F is smaller than the radial thickness of the circumferential opposite end sections 414F of each of the holder protrusion portions 41F. This further enhances the flexibility of the circumferential center section 413F of each of the holder protrusion portions 41E. Accordingly, it is possible to prevent stresses from being transferred to the holder recess portions 42F.

Figure 20:
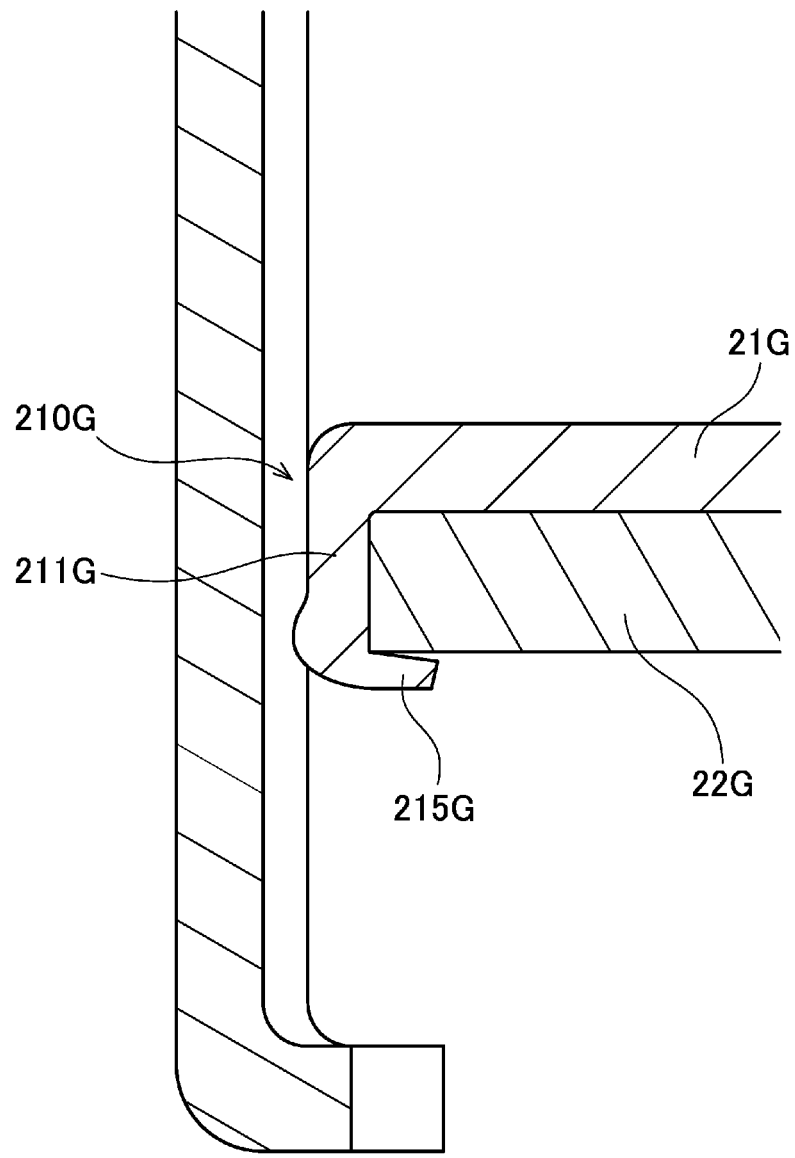
FIG. 20 is a partial vertical section view showing a motor according to a yet still further modified example of a preferred embodiment of the present invention.

The circuit board may be arranged on either the upper surface or the lower surface of the attachment plate. For example, as shown in FIG. 20, the circuit board 22G may be arranged on the lower surface of the attachment plate 21G. In the example shown in FIG. 20, the burring portion 211G protrudes downward from the verge of the first insertion hole 210G of the attachment plate 21G. The caulking sections 215G are preferably provided on the lower surface of the circuit board 22G.

Figure 21:
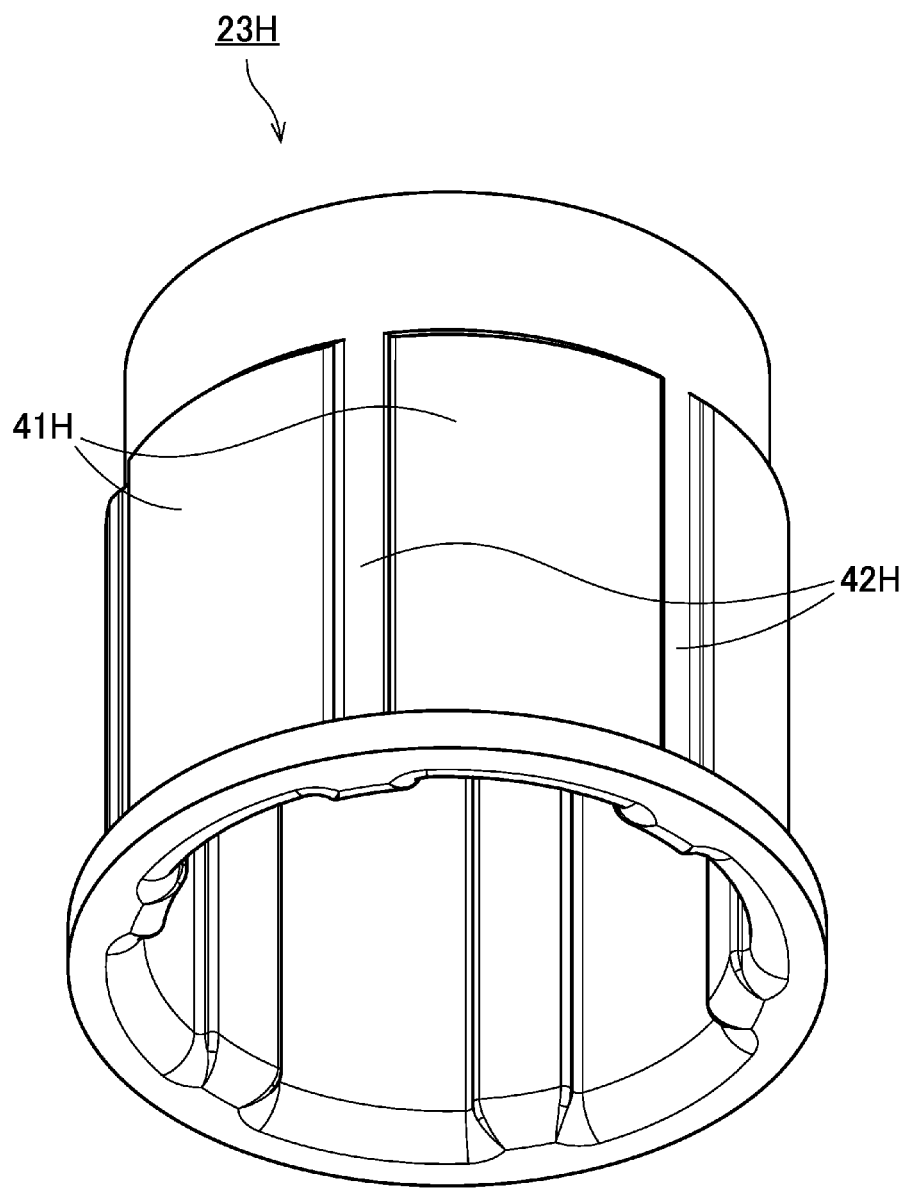
FIG. 21 is a perspective view showing a bearing holder according to a further modified example of a preferred embodiment of the present invention.

The number of protrusions and recesses provided in the bearing holder may differ from those of the foregoing preferred embodiments. For example, as shown in FIG. 21, the bearing holder 23H may preferably include six holder protrusion portions 41H and six holder recess portions 42H. As shown in FIG. 21, each of the holder protrusion portions 41H may not include any secondary protrusion section. All or part of the radial outer surface of each of the holder protrusion portions may make contact with the surrounding member. All or part of the radial inner surface of each of the holder recess portions may make contact with the bearing unit.

The respective dimensions of the holder protrusion portions and the holder recess portions may differ from those shown in the respective figures of the subject application. In order to enhance the flexibility of the holder protrusion portions, it is preferred that the circumferential width of each of holder protrusion portions be set as large as possible. For example, it is preferred that the circumferential width of each of holder protrusion portions be set larger than the circumferential width of each of the holder recess portions.

In addition, the specific shapes of the motor may differ from those shown in the respective figures of the subject application. The respective components of the preferred embodiments and modified examples described above may be appropriately combined unless a conflict arises.

The preferred embodiments of the present invention and modifications thereof can be applied to a motor.

While the present invention has been shown and described with respect to the preferred embodiments, the present invention is not limited thereto. It will be understood by those skilled in the art that various changes and modifications may be made without departing from the scope of the present invention as defined in the following claims.

What is claimed is:

1. A motor, comprising:
a bearing holder having a substantially cylindrical shape axially extending along a vertically-extending center axis;
a bearing unit fixed to a radial inner surface of the bearing holder;
a surrounding member fixed to a radial outer surface of the bearing holder, the surrounding member including an insertion hole through which the bearing holder extends;
a shaft rotatably supported by the bearing unit; and
a magnet rotating together with the shaft; wherein
the bearing holder includes a plurality of holder protrusion portions each including a radial outer surface at least partially making contact with the surrounding member and a plurality of holder recess portions positioned radially inward of the plurality of holder protrusion portions, each of the plurality of holder recess portions including a radial inner surface at least partially making contact with the bearing unit;
the plurality of holder protrusion portions and the plurality of holder recess portions are alternately arranged along a circumferential direction;
a central angle of a portion of an inner circumferential surface of the surrounding member remaining out of contact with each of the holder protrusion portions is equal to or larger than a central angle of a portion of an outer circumferential surface of the bearing unit making contact with each of the plurality of holder recess portions.

2. The motor of claim 1, wherein the bearing holder further includes a plurality of slant portions interconnecting the plurality of holder protrusion portions and the plurality of holder recess portions, the plurality of slant portions obliquely extending with respect to a radial direction.

3. The motor of claim 1, wherein the surrounding member includes a plurality of press-fit protrusion portions protruding radially inward from the inner circumferential surface of the surrounding member, the plurality of press-fit protrusion portions making contact with the plurality of holder protrusion portions.

4. The motor of claim 3, wherein a circumferential width of a radial inner surface of each of the plurality of press-fit protrusion portions is smaller than a circumferential width of the radial outer surface of each of the plurality of holder protrusion portions.

5. The motor of claim 1, wherein each of the plurality of holder protrusion portions includes a secondary protrusion section protruding radially outward from the radial outer surface of each of the plurality of holder protrusion portions, the secondary protrusion section making contact with the surrounding member.

6. The motor of claim 1, wherein the surrounding member includes a positioning protrusion portion protruding radially inward from the inner circumferential surface of the surrounding member, the positioning protrusion portion being arranged between ones of the plurality of holder protrusion portions adjoining each other, the positioning protrusion portion including a radial inner end positioned radially inward of the outer circumferential surface of each of the plurality of holder protrusion portions.

7. The motor of claim 6, wherein a circumferential width of the positioning protrusion portion is smaller than a circumferential width of each of the plurality of holder recess portions, a circumferential width of other protrusion portions arranged on the inner circumferential surface of the surrounding member is larger than a circumferential width of each of the plurality of holder recess portions.

8. The motor of claim 1, wherein the bearing holder further includes an insertion portion arranged above the plurality of holder protrusion portions, the insertion portion being smaller in outer diameter than the radial outer diameter of each of the plurality of holder protrusion portions.

9. The motor of claim 1, wherein the bearing holder includes a tubular portion including the plurality of holder protrusion portions, the plurality of holder recess portions, and a flange portion extending radially outward from a lower end section of the tubular portion.

10. The motor of claim 9, wherein the bearing holder includes a plurality of through-holes defined below the surrounding member and above the flange portion, the through-holes radially extending through the plurality of holder protrusion portions.

11. The motor of claim 9, wherein the bearing holder includes a plurality of through-holes or cutouts axially extending through the flange portion, each of the plurality of through-holes or cutouts overlapping in circumferential position with each of the plurality of holder protrusion portions.

12. The motor of claim 1, wherein the bearing unit includes a first bearing and a second bearing which are equal in outer diameter to each other, the radial inner surface of each of the plurality of holder recess portions axially extending at a substantially constant diameter from a radial outer position of the first bearing to a radial outer position of the second bearing.

13. The motor of claim 1, wherein the bearing unit includes a first bearing and a second bearing larger in outer diameter than the first bearing, the bearing holder including a small-diameter portion arranged to hold the first bearing and a large-diameter portion larger in diameter than the small-diameter portion, the large-diameter portion being positioned above or below the small-diameter portion and arranged to hold the second bearing.

14. The motor of claim 12, further comprising a spacer interposed between the first bearing and the second bearing.

15. The motor of claim 1, wherein axial positions of contact portions between the plurality of holder protrusion portions and the surrounding member differ from axial positions of contact portions between the plurality of holder recess portions and the bearing unit.

16. The motor of claim 1, wherein a circumferential width of each of the plurality of holder protrusion portions is larger than a circumferential width of each of the plurality of holder recess portions.

17. The motor of claim 1, wherein a curvature radius of a circumferential center section of each of the plurality of holder protrusion portions is larger than a distance between the circumferential center section and the center axis.

18. The motor of claim 1, wherein a radial thickness of a circumferential center section of each of the plurality of holder protrusion portions is smaller than a radial thickness of circumferential opposite end portions of each of the plurality of holder protrusion portions.

19. The motor of claim 1, wherein the surrounding member is a stator core including a ring-shaped core-back, the core-back including an inner circumferential surface making contact with the plurality of holder protrusion portions.

* * * * *